United States Patent
Yang et al.

(10) Patent No.: US 10,083,617 B2
(45) Date of Patent: Sep. 25, 2018

(54) PORTABLE APPARATUS AND SCREEN DISPLAYING METHOD THEREOF

(71) Applicant: Samsung Electronics Co., Ltd., Suwon-si (KR)

(72) Inventors: Pil-seung Yang, Seoul (KR); Young-ah Seong, Seoul (KR); Chan-hong Mim, Yongin-si (KR); Say Jang, Yongin-si (KR); Ji-su Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 472 days.

(21) Appl. No.: 14/244,435

(22) Filed: Apr. 3, 2014

(65) Prior Publication Data
US 2014/0356843 A1  Dec. 4, 2014

(30) Foreign Application Priority Data
Jun. 3, 2013  (KR) ........................ 10-2013-0063385

(51) Int. Cl.
  *G09B 5/00* (2006.01)
  *G06F 3/0488* (2013.01)
  *G06F 3/14* (2006.01)

(52) U.S. Cl.
  CPC ............. *G09B 5/00* (2013.01); *G06F 3/0488* (2013.01); *G06F 3/1454* (2013.01)

(58) Field of Classification Search
  USPC ........................................................ 434/362
  See application file for complete search history.

(56) References Cited

U.S. PATENT DOCUMENTS

| 7,508,354 | B1 | 3/2009 | Sanders et al. |
| 8,296,728 | B1 | 10/2012 | Webster |
| 2003/0207244 | A1 | 11/2003 | Sakai et al. |
| 2011/0239133 | A1* | 9/2011 | Duffus .................. G06F 9/461 |
| | | | 715/753 |
| 2012/0262379 | A1 | 10/2012 | King |
| 2013/0017526 | A1* | 1/2013 | Nguyen .................. G09B 7/02 |
| | | | 434/362 |

(Continued)

FOREIGN PATENT DOCUMENTS

| CN | 101635102 A | 1/2010 |
| JP | 2012-159947 A | 8/2012 |

(Continued)

OTHER PUBLICATIONS

Communication dated Sep. 30, 2014 issued by International Searching Authority in counterpart International Patent Application No. PCT/KR2014/004709.

(Continued)

*Primary Examiner* — Kesha Frisby
(74) *Attorney, Agent, or Firm* — Sughrue Mion, PLLC

(57) ABSTRACT

A screen displaying method in a portable apparatus includes displaying a personal screen of an application executed by the portable apparatus in response to input user identification information; detecting a touch on the personal screen; and controlling the personal screen in response to the touch to display a second screen, wherein the second screen includes at least a portion of a common screen which is a screen of an external device connectable through a network.

16 Claims, 13 Drawing Sheets

(56) References Cited

U.S. PATENT DOCUMENTS

2014/0160153 A1* 6/2014 Singh .................. G06Q 10/101
345/629

FOREIGN PATENT DOCUMENTS

KR 10-1000893 B1 12/2010
KR 10-2012-0000903 A 1/2012

OTHER PUBLICATIONS

Communication dated Dec. 21, 2016, issued by the European Patent Office in counterpart European Application No. 14807513.8.
Communication dated Nov. 28, 2017, issued by the European Patent Office in counterpart European Patent Application No. 14807513.8.
Communication dated Apr. 2, 2018, from the State Intellectual Property Office of People's Republic of China in counterpart Application No. 201480034369.2.

* cited by examiner

PORTABLE APPARATUS AND SCREEN DISPLAYING METHOD THEREOF

CROSS-REFERENCE TO RELATED APPLICATION

This application claims priority from Korean Patent Application No. 10-2013-0063385, filed on Jun. 3, 2013, in the Korean Intellectual Property Office, the disclosure of which is incorporated herein by reference.

BACKGROUND

Field

Apparatuses and methods consistent with exemplary embodiments relate to a portable apparatus and a screen displaying method thereof, and more particularly, to a portable apparatus connectable with another portable apparatus and a screen displaying method thereof using a touch motion.

Description of the Related Art

Various services and functions provided by a portable apparatus have recently been expanded. In response to development of a wireless network and various demands of users, technology has been developed to share data (e.g., a music file, a moving picture, etc.) between portable apparatuses or perform control (e.g., execution of a moving picture, etc.) one of a portable apparatus from another portable apparatus. In other words, there is a need for a technology of displaying a screen of another portable apparatus or using the displayed screen of another portable apparatus for sharing data among a plurality of portable apparatuses or for controlling a portable apparatus from another portable apparatus.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, a screen displaying method in a portable apparatus includes: displaying a personal screen of an application executed by the portable apparatus in response to input user identification information; detecting a touch on the personal screen; and controlling the personal screen in response to the touch to display a second screen, wherein the second screen includes at least a portion of a common screen which is a screen of an external device connectable through a network.

The screen displaying method may further include verifying the input user identification information based on user identification information stored in the portable apparatus.

The application may be an education application and the personal screen may include at least one of a teacher personal screen and a student personal screen in response to the input user identification information, and the common screen may include a screen of an interactive white board connected with the portable apparatus through a wired or wireless network.

The touch may include at least one from among a flick, a drag, and a drag and drop.

The controlling may include changing the personal screen into the common screen according to a direction of the touch on the personal screen.

The controlling may include displaying a part of the common screen at one side of the personal screen in response to a direction of the touch on the personal screen.

The controlling may include changing the personal screen into a management screen displaying at least one reduced student personal screen in response to a direction of the touch on the personal screen.

The screen displaying method may further include changing the common screen into a management screen in response to a direction of the touch on the common screen, the management screen including at least one reduced student personal screen.

The at least one reduced student personal screen may be displayed on the management screen is enlarged in response to a tap detected on a corresponding reduced student personal screen.

The at least one reduced student personal screen of the management screen may display a message receiving icon informing that a message is received from a student portable apparatus corresponding to the at least one student personal screen.

The student personal screen may be displayed in response to the user identification information, and a message written on the student personal screen may be transmittable to another portable apparatus.

The management screen may be changed into the personal screen in response to a touch on the management screen.

The controlling may include changing the personal screen into the common screen when the touch on the personal screen is a drag and drop, and displaying contents selected by the drag and drop on the common screen.

The contents may include a text file, an image file, an audio file, a video file or, a reduced student personal screen.

The screen controlling may include changing the personal screen into the common screen in response to the touch detected on the personal screen.

The screen displaying method may further include providing at least one of a visual feedback, an aural feedback and a tactile feedback in response to the touch on the personal screen.

According to an aspect of another exemplary embodiment, a portable apparatus includes a communication unit configured to communicate with second portable apparatus and an external device; a touch screen; and a controller configured to control the communication unit and the touch screen, the controller configured to display a screen of an application executed by the portable apparatus including a personal screen corresponding to user identification information of the portable apparatus and configured to change the personal screen into a different screen including at least a portion of a common screen of the external device received through the communication unit in response to a touch on the personal screen.

The application may be an education application and the personal screen may include at least one of a teacher personal screen and a student personal screen in response to the input user identification information, and the common screen includes a screen of an interactive white board connected with the portable apparatus through a wired or wireless network, and the controller may control the personal screen and the common screen to be displayed in response to the touch on the personal screen.

The controller may transmit and/or receive a message to and/or from the second portable apparatus through the communication unit.

The touch may be detected through at least one of a touch using an input unit, a touch using a body of a user, hovering of the input unit over the touch screen, and hovering of the user body over the touch screen.

According to an aspect of another exemplary embodiment, a screen displaying method in a portable apparatus includes displaying a personal screen; receiving, from an external device connectable through a network, a control signal corresponding to knocking detected on a common screen of the external device; and changing the displayed personal screen into the common screen of the external device in response to the received control signal.

The control signal may include request information for requesting the personal screen to be changed into the common screen where the knocking is detected.

According to an aspect of another exemplary embodiment, a portable apparatus includes: a communication unit configured to communicate with a second portable apparatus and an external device; a touch screen; and a controller configured to control the communication unit and the touch screen, the controller displaying, on the touch screen, a personal screen corresponding to user identification information of the portable apparatus and a common screen provided in the external device, receiving a control signal corresponding to knocking input on the common screen of the external device through the communication unit, and changing the personal screen into the common screen in response to the received control signal.

According to an aspect of another exemplary embodiment, a display apparatus includes a controller configured to detect a user input on an application executed the display apparatus and determine a screen of the display apparatus corresponding to the detected user input; and a display unit configured to display, according to a result of the determination, at least one of a portion of a first screen representing the application executed by the display apparatus and at least a portion of a second screen representing the application executed by an external device connected through a network.

The display apparatus may further include a touch screen, and the user input may be a touch input on the touch screen.

The controller may determine the user input based on the touch input and determine the screen according to at least one of a type and a direction of the touch input.

The display apparatus may be connected to a plurality of external devices, and the display unit may display at least a portion of a third screen representing the application executed by a first external device according to a first direction of the touch input, and the display unit may display at least a portion of a fourth screen representing the application executed by a second external device according to a second direction of the touch input.

The second screen may be scrolled over on the first screen according to at least one from among a distance, a duration time, a touch pressure, or a speed of the touch input on the touch screen.

According to an aspect of another exemplary embodiment, provided is a non-transitory computer readable recording medium having embodied thereon at least one program including a command for performing the screen displaying method as above.

According to an aspect of another exemplary embodiment, provided is a non-transitory computer readable recording medium having embodied thereon at least one program that includes a command for performing a method of displaying a screen in a display apparatus, the method including: detecting a user input on an application executed by the display apparatus; determining a screen of the display apparatus corresponding to the detected user input; and displaying, according to a result of the determination, at least one of a portion of a screen representing the application executed by the display apparatus and at least a portion of a screen representing the same application executed by an external device connected through a network.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
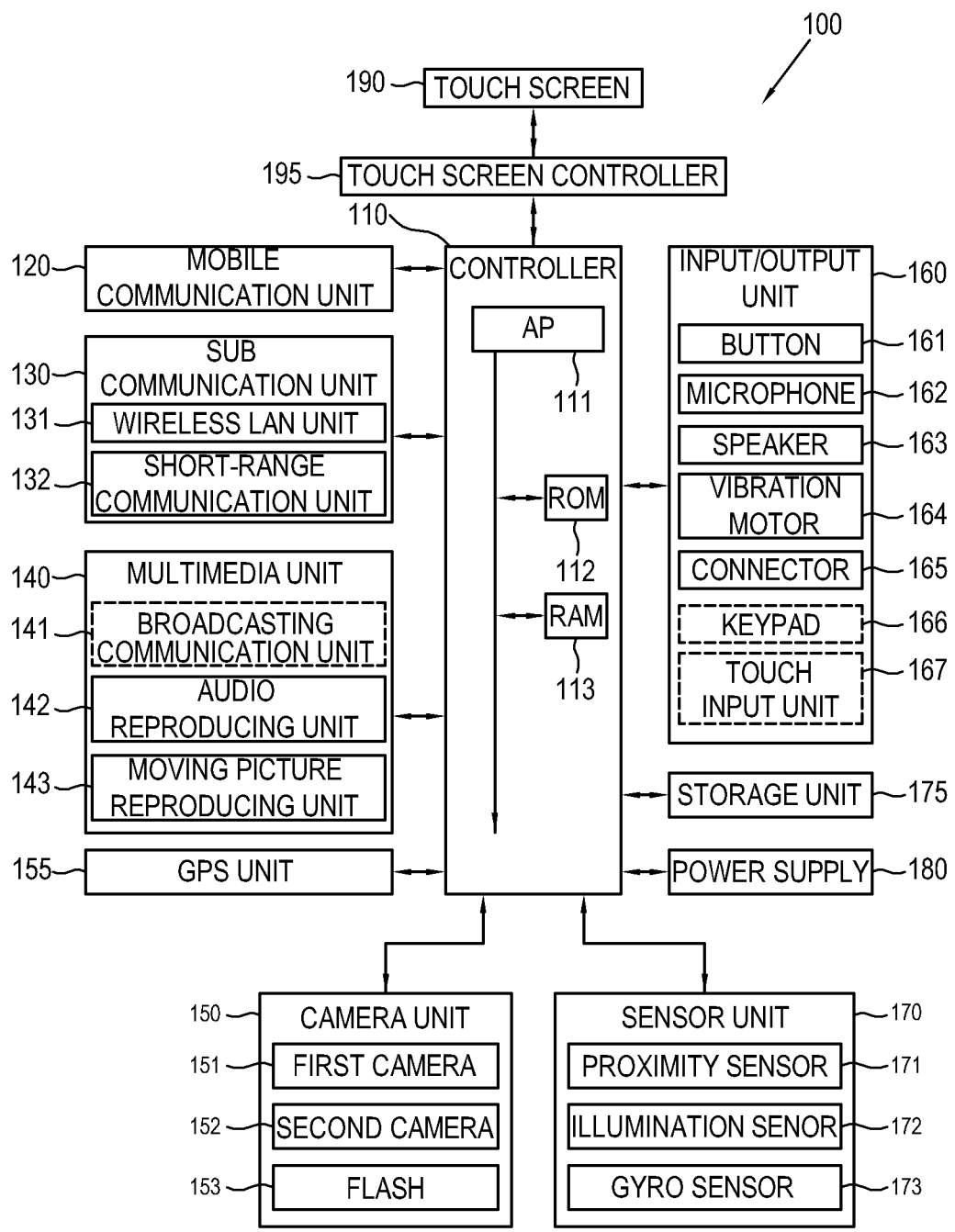
FIG. 1 is a schematic block diagram showing a portable apparatus according to an exemplary embodiment.

Below, exemplary embodiments will be described in detail with reference to accompanying drawings. Like numerals and symbols shown in the drawings refer to like parts or elements performing substantially the same functions.

Terms including ordinal numerals such as "first," "second," etc. may be used in describing various elements, but the elements are not limited by the terms. Such terms are used only for distinguishing one element from another element. For example, a first element may be named a second element without departing from the scope of the exemplary embodiment. Likewise, the second element may be named the first element. The term "and/or" refers to any one combination of a plurality of related items or any one of the plurality of related items.

An application refers to software executed under a computer operating system (OS) or a mobile OS and directly used by a user. For example, the application may include a word processor, a spread sheet, a social network system (SNS), chatting, a map, a music player, a moving picture player, etc.

A widget refers to a mini application as one of graphic user interfaces (GUI) for more smoothly supporting interaction between a user and the application or an OS. For example, the widget may include a weather widget, a calculator widget, a clock widget, etc. The widget may be made in the form of a shortcut icon and installed at a desk top or a portable apparatus, a blog, an Internet café, a personal homepage, etc. so that corresponding services may be directly used by clicking the shortcut icon without using a web browser. Also, the widget may include a shortcut icon for taking a shortcut via a designated path or executing a designated application.

The term "drag" refers to an operation of moving a finger or a touch input unit to a different position on a screen while a user keeps touching the screen with the finger or the touch input unit. In accordance with the drag, a selected object may be moved. Also, when the screen is touched and dragged without selecting an object on the screen, the screen itself may be moved or another screen may be displayed by the drag.

The term "flick" refers to an operation of dragging with a finger or a touch tool at a critical speed (e.g., 100 pixels/sec) or higher. It is possible to distinguish between the drag and the flick by comparing the moving speed of the finger or the touch input unit with the critical speed (e.g., 100 pixels/sec).

The term "drag and drop" refers to an operation of dragging an object selected by a user with the finger or the touch input unit to a different position on the screen and then dropping the selected object (i.e., releasing a touch on the selected object). By the drag and drop, the selected object may be moved to a different position.

The term "tap" refers to an operation of quickly touching the screen with the finger or the touch input unit of a user. When the tap is performed, difference in time between a point of time when the finger or the touch tool touches the screen and a point of time when the finger or the touch tool is released from the screen may be relatively very short.

Terms used herein are used to just explain the exemplary embodiment, and not intended to limit and/or restrict the disclosure. A singular form involves a plural form as long as it contextually separates out different meanings. In this application, it will be understood that terms such as "include," "have" or the like are used to involve the presence of characteristics, numerals, steps, operations, elements, parts or combination thereof described in the specification, and do not exclude the presence or probable addition of one or more different characteristics, numerals, steps, operations, elements, parts or combination thereof. Like numerals shown in the drawings refer to like members performing substantially the same functions.

Figure 2:
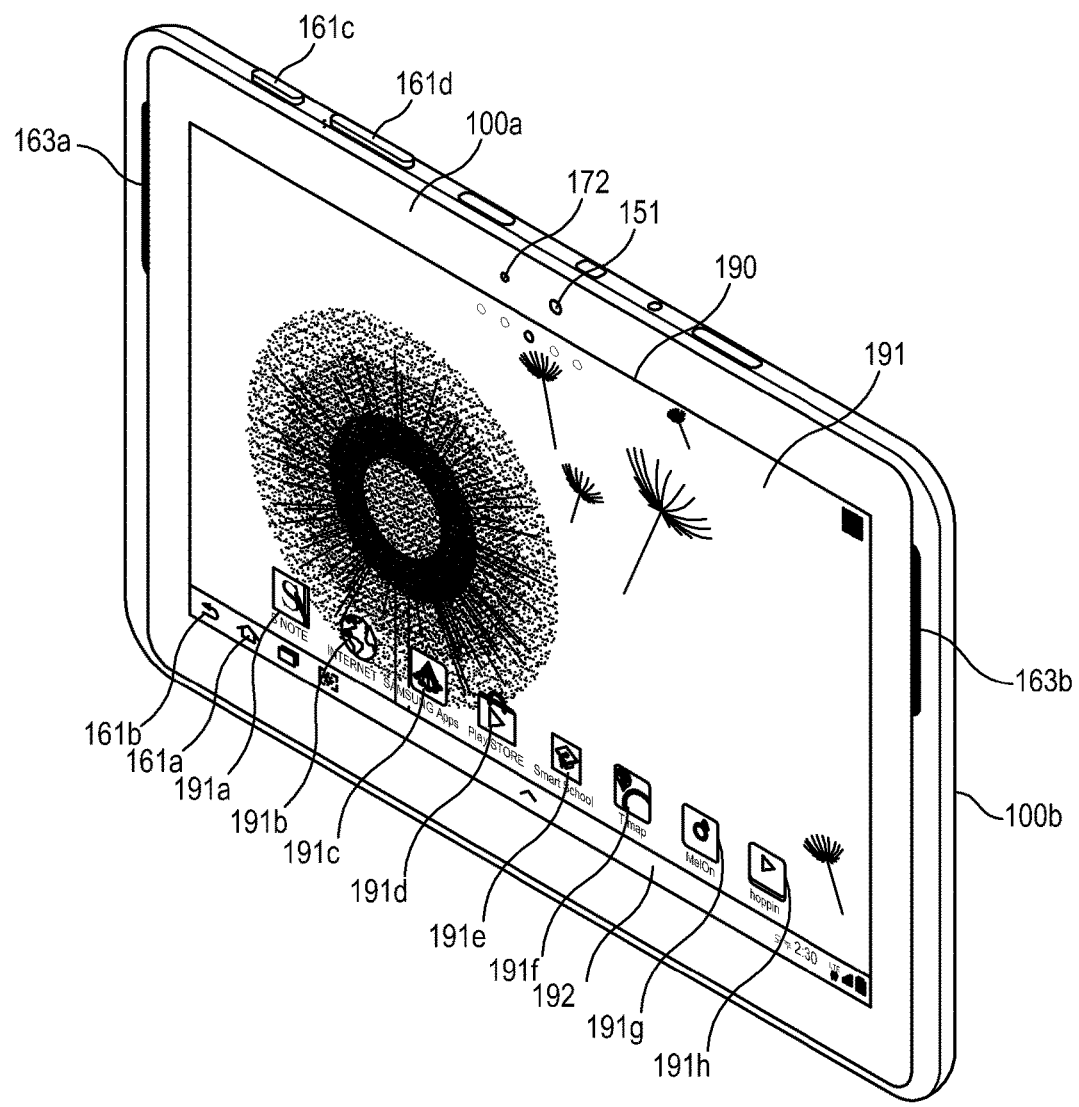
FIG. 2 is a schematic front perspective view showing a portable apparatus according to an exemplary embodiment.
Figure 3:
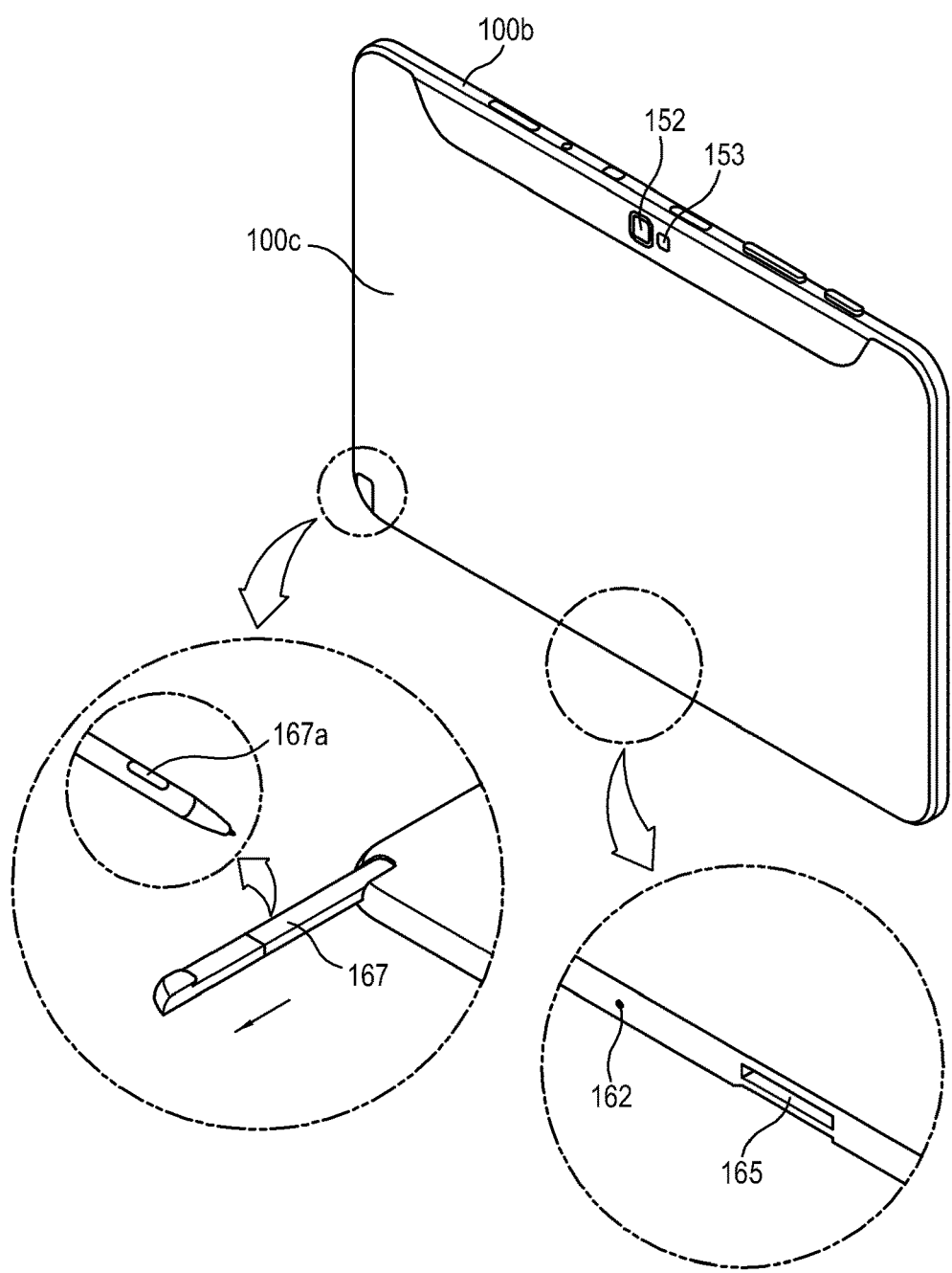
FIG. 3 is a schematic rear perspective view showing a portable apparatus according to an exemplary embodiment.

FIG. 1 is a schematic block diagram showing a portable apparatus according to an exemplary embodiment. FIG. 2 is a schematic front perspective view showing a portable apparatus according to an exemplary embodiment. FIG. 3 is a schematic rear perspective view showing a portable apparatus according to an exemplary embodiment.

Referring to FIGS. 1 to 3, a portable apparatus 100 may be wired or wirelessly connected to an external device (not shown) through a mobile communication unit 120, a sub communication unit 130 and a connector 165. The external device may include, for example, a portable apparatus, a cellular phone, a smart phone, a tablet personal computer, an interactive white board, and a server. The portable apparatus refers to an apparatus that transmits and/or receives data through the communication unit thereof. The portable apparatus may include one touch screen or two or more touch screens. For example, the portable apparatus may include an MP3 player, a moving picture player, a tablet PC, a three-dimensional (3D) television (TV), a smart TV, a light emitting diode (LED) TV, a liquid crystal display (LCD) TV, etc. Also, the portable apparatus 100 may include an apparatus capable of transmitting and/or receiving data through interaction (e.g., a touch or a touch gesture) input on the touch screen of the portable apparatus and another connectable external device.

According to an exemplary embodiment, the portable apparatus 100 may include a touch screen 190 and a touch screen controller 195. The portable apparatus 100 may further include a controller 110, a mobile communication unit 120, a sub communication unit 130, a multimedia unit 140, a camera unit 150, a global positioning system (GPS) unit 155, an input and/or output unit 160, a sensor unit 170, a storage 175 and a power supply 180.

The sub communication unit 130 may include at least one of a wireless local area network (WLAN) unit 131 and a short-range communication unit 132, and the multimedia unit 140 may include at least one of a broadcasting communication unit 141, an audio reproducing unit 142 and a moving picture reproducing unit 143. The camera unit 150 may include at least one of a first camera 151 and a second camera 152. The input and/or output unit 160 may include at least one of a button 161, a microphone 162, a speaker 163, a vibration motor 164, a connector 165, a key pad 166 and a touch input unit 167. The sensor unit 170 may include a proximity sensor 171, an illumination sensor 172 and a gyro sensor 173.

The controller 110 may include an application processor (AP) 111, a read only memory (ROM) 112 in which a control program for controlling the portable apparatus 100 is stored, and a random access memory (RAM) 113 which stores a signal or data input from an external source or is used as a storage region with regard to various operations performed in the portable apparatus 100. The AP 111 may include a processor, a microprocessor, a central processing unit (CPU), or an integrated circuit for executing programmable instructions stored in a storage such as a memory (e.g., ROM 112).

The controller 110 controls general operations of the portable apparatus 100, controls signal flows between elements 120 to 195 of the portable apparatus 100, and processes data. The controller 110 controls power supplied from the power supply 180 to the elements 120 to 195. Also, when a user's input is received or a preset condition is satisfied, the controller 190 may execute an operating system (OS) and various applications stored in the storage 175.

The AP 111 may include a graphic processing unit (GPU, not shown) for processing graphics. The AP 111 may be achieved by a system on chip (SoC) where a core (not shown) and a GPU (not shown) are provided. The AP 111 may include at least one from among a single core, a dual core, a triple core, a quad core and multiple cores. Also, the AP 111, the ROM 112, and the RAM 113 may be connected to one another through an internal bus.

The controller 110 may control the mobile communication unit 120, the sub communication unit 130, the multimedia unit 140, the camera unit 150, the GPS unit 155, the input and/or output unit 160, the sensor unit 170, the storage 175, the power supply 180, the touch screen 190 and the touch screen controller 195.

According to an exemplary embodiment, the controller 110 controls the touch screen to display a personal screen corresponding to identification information of a user of the portable apparatus 100 and an education application which provides a common screen, displays the personal screen on the education application in response to the input identification information of the user, detects a touch gesture including successive touch motions on the personal screen, and changes the personal screen to another screen in response to the successive touch motions. It should be noted that the term "successive touch motions" may include any touch gesture that includes a touch start position and a touch termination position that is different from the touch start position. However, the disclosure is not limited thereto and the controller 110 may control the touch screen in response to any type of a touch gesture such as a single touch, click, double click, tap, etc.

The controller 110 may check the user identification information that is unique information for identifying a user stored in the portable apparatus 100.

The controller 110 may control to determine whether the successive touch motions is one of flick and drag starting from a bezel of the portable apparatus 100, one of flick and drag starting from the touch screen of the portable apparatus 100, and drag and drop starting from the personal screen.

The controller 110 may control the personal screen to be changed into the common screen in response to the successive touch motions first detected in a region adjacent to, for example, a side of the personal screen.

The controller 110 may control a portion of the personal screen and a portion of the common screen to be displayed together in response to the successive touch motions detected in a region adjacent to a side of the personal screen.

The controller 110 may control the common screen to be changed into a management screen in response to the successive touch motions first detected in a region adjacent to a side of the common screen. Here, the management screen may display at least one reduced student personal screen.

In an exemplary embodiment, when a tap is detected in the reduced student personal screen of the management screen, the controller 110 may control the reduced student personal screen to be enlarged on the management screen.

The controller 110 may control the reduced student personal screen of the management screen to display a message receiving icon informing that a message is received from the student portable apparatus corresponding to the student personal screen.

The controller 110 may control the management screen to be changed into a personal screen in response to the successive touch motions first detected in a region adjacent to a side of the management screen.

When the successive touch motions first detected in the personal screen is drag and drop of a selected content toward the common screen, the controller 110 may control the personal screen to be changed into the common screen and contents to be displayed on the common screen.

The controller 110 may control the personal screen to be changed into the common screen in response to the successive touch motions first detected on the personal screen.

The controller 110 may control one of a visual feedback, an aural feedback and a tactile feedback to be provided in response to the successive touch motions detected on the personal screen, the common screen or the management screen.

According to an exemplary embodiment, the term "controller" is understood as including the AP 111, the ROM 112 and the RAM 113.

The mobile communication unit 120 may use mobile communication to connect with an external device (not shown) through one or more antennas under control of the controller 110. The mobile communication unit 120 transmits and/or receives a wireless signal for a voice call, a video call, a short message service (SMS), a multimedia messaging service (MMS) and data communication to and/or from the external device. The external device may include, for example, a cellular phone, a smart phone, a tablet PC or a portable apparatus (not shown) having a phone number connectable with the portable apparatus 100.

The sub communication unit 130 may include at least one of the WLAN unit 131 and the short-range communication unit 132. For example, the sub communication unit 130 may include the WLAN unit 131, or the short-range communication unit 132, or both the WLAN unit 131 and the short-range communication unit 132.

The WLAN unit 131 may wirelessly connect with an access point (AP, not shown) in a place where the AP is installed, under control of the controller 110. The WLAN unit 131 supports WLAN standards IEEE802.11x of institute of electrical and electronics engineers (IEEE). Also, the short-range communication unit 132 performs wireless communication for a local area between the portable apparatus 100 and the external device under control of the controller. The short-range communication may include bluetooth, bluetooth low energy, infrared data association (IrDA), Wi-Fi, Ultra Wideband (UWB), near field communication (NFC), etc.

The portable apparatus 100 may include at least one from among the mobile communication unit 120, the WLAN unit 131, and the short-range communication unit 132 in accordance with performance thereof. For example, the portable apparatus 100 may include combination of the mobile communication unit 120, the WLAN unit 131, and the short-range communication unit 132.

According to an exemplary embodiment, the communication unit 130 may connect with a teacher portable apparatus, a student portable apparatus or an interactive white board under control of the controller 110. The communication unit 130 may transmit and/or receive a personal screen and a common screen to and/or from the teacher portable apparatus, the student portable apparatus or the interactive white board under control of the controller. The communication unit 130 may transmit and/or receive a control signal from among the teacher portable apparatus, the student portable apparatus and the interactive white board under control of the controller 119.

According to an exemplary embodiment, the term "communication unit" is understood as including at least one of the mobile communication unit 120 and the sub communication unit 130.

The multimedia unit 140 may include a broadcasting communication unit 141, an audio reproducing unit 142 or a moving picture reproducing unit 143. The broadcasting communication unit 141 may receive a broadcasting signal, e.g., a TV broadcasting signal, a radio broadcasting signal or a data broadcasting signal, and additional broadcasting information, e.g., electric program guide (EPG) or electric service guide (ESG), from an external broadcasting station through a broadcasting communication antenna (not shown) under control of the controller 110. Also, the controller 110 may reproduce the received broadcasting signal and additional broadcasting information through a touch screen, a video codec unit (not shown) and an audio codec unit (not shown).

The audio reproducing unit 142 may reproduce an audio source, e.g., an audio file having a file extension such as mp3, wma, ogg or wav, previously stored in the storage 175 of the portable apparatus 100 or received from the external source through the audio codec unit under control of the controller 110.

According to an exemplary embodiment, the audio reproducing unit 142 reproduces an aural feedback (e.g., output of the audio source stored in the storage) corresponding to a touch or successive touch motions detected on the touch screen 190 through the audio codec unit under control of the controller 110.

The moving picture reproducing unit 143 may reproduce a digital moving picture source, e.g., a file having a file extension such as mpeg, mpg, mp4, avi, mov or mkv, previously stored in the portable apparatus 100 or received from the external source through the video codec unit under control of the controller 110. Applications installable in the portable apparatus 100 may reproduce an audio source or moving picture file through the audio codec unit or the video codec unit.

According to an exemplary embodiment, the moving picture reproducing unit 143 may reproduce a visual feedback, e.g., output of the moving picture source stored in the storage, corresponding to a touch or successive touch motions detected on the touch screen 190 through the video codec unit under control of the controller 110.

It will be appreciated by a person having an ordinary skill in the art that the controller 110 may use various kinds of video and audio codec units that have been produced and merchandised.

The multimedia unit 140 may include the audio reproducing unit 142 and the moving picture reproducing unit 143 except the broadcasting communication unit 141 in accordance with the performance or the structure of the portable apparatus 100. Also, the audio reproducing unit 142 or the moving picture reproducing unit 143 of the multimedia unit 140 may be included in the controller 110. According to an exemplary embodiment, the term "video codec unit" may be understood as including one or a plurality of video codec units. Also, according to an exemplary embodiment, the term "audio codec unit" may be understood as including one or a plurality of audio codec units.

The camera unit 150 may include at least one of a first camera 151 on a front side 100a (refer to FIG. 2) of the portable apparatus 100 and a second camera 152 (refer to FIG. 1) of on a rear side 100c (refer to FIG. 3) of the portable apparatus 100 for capturing a still image or a moving picture under control of the controller 110. The camera unit 150 may include one or both of the first camera 151 and the second camera 152. Also, the first camera 151 or the second camera 152 may include an auxiliary light source (e.g., a flash 153) for providing certain intensity of light needed for capturing an image.

Under control of the controller 110, when the first camera 151 on the front side 100a is adjacent to an additional camera (e.g., a third camera, not shown) positioned on the front side 100a such that, for example, a distance between the first camera 151 and the third camera on the front side 100a is longer than 2 cm and shorter than 8 cm, the first camera 151 and the third camera may capture a 3D still image or a 3D moving picture. Also, when the second camera 152 on the rear side 100c is adjacent to an additional camera (e.g., a fourth camera, not shown) positioned on the rear side 100c such that, for example, when a distance between the second camera 152 and the fourth camera on the rear side 100c is longer than 2 cm and shorter than 8 cm, the second camera 152 and the fourth camera may capture a 3D still image or a 3D moving picture. Also, the second camera 152 may use a separate adapter (not shown) to capture a wider angle picture, a telephoto picture, and a closer-up picture.

The GPS unit 155 periodically receives information (e.g., position and time information of a GPS satellite (not shown) receivable in the portable apparatus 100) from a plurality of GPS satellites (not shown) around the earth's orbit. The portable apparatus 100 determines the position, velocity or time of the portable apparatus 100 based on the information received from the plurality of GPS satellites.

The input and/or output unit 160 may include at least one from among the button 161, the microphone 162, the speaker 163, the vibration motor 164, the connector 165, the key pad 166 and the touch input unit 167.

Referring to FIG. 2, the button 161 includes a home button 161a, a back button 161b, and a menu button (not shown) placed in a lower portion of the front side 100a. The button 161 may include a power/lock button 161c and at least one volume button 161e on a lateral side 100b of the portable apparatus 100. According to an exemplary embodiment, in the portable apparatus 100, the button 161 may include only the home button 161a. Also, in the portable apparatus 100, the button 161 may be implemented not by a physical button but by a touch button. The touch button of the button 161 may be provided outside the touch screen 190. Alternatively, in the portable apparatus 100, the touch button of the button 161 may be displayed as a text or an icon on the touch screen 190.

The microphone 162 receives voice or sound from the external source and generates an electric signal under control of the controller 110. The electric signal generated in the microphone 162 is converted by the audio codec unit and stored in the storage 175 and/or output through the speaker 163. One or a plurality of microphones 162 may be placed on at least one of the front side 100a, the lateral side 100b and the rear side 100c of the portable apparatus 100. Alternatively, one or a plurality of microphones 162 may be placed only on the lateral side 100b of the portable apparatus 100.

The speaker 163 may output sound corresponding to various signals (e.g., a wireless signal, a broadcasting signal, an audio source, a moving picture file or photographing, etc.) of the mobile communication unit 120, the sub communication unit 130, the multimedia unit 140 or the camera unit 150 through the audio codec unit to the external source under control of the controller 110.

The speaker 163 may output sound corresponding to the functions performed by the portable apparatus 100 (e.g., touch control sound corresponding to a phone number input, or a button control sound corresponding to photographing). At least one speaker 163 may be placed on the front side 100a, the lateral side 100b and the rear side 100c of the portable apparatus 100. Referring to FIG. 2, a plurality of speakers 163a and 163b are placed on the front side 100a of the portable apparatus 100. Alternatively, the speakers 163a and 163b may be respectively placed on the front side 100a and the rear side 100c of the portable apparatus 100. For example, the speaker 163a may be placed on the front side 100a of the portable apparatus 100 and the other speaker 163b may be paced on the rear side 100c. Although it is depicted in FIG. 2 that the plurality of speakers 163a and 163b includes two speakers, it should be noted that the plurality of speakers may include any different number of speakers.

Also, one or a plurality of speakers (not shown) may be placed on the lateral side 100b. The portable apparatus 100 including at least one speaker (not shown) placed on the lateral sides 100b thereof may offer a user a sound output effect different compared to when the speakers are not placed on the lateral side 100b but placed on the front side 100a and the rear side 100c of the portable apparatus 100.

According to an exemplary embodiment, the speaker 163 may output the aural feedback corresponding to the touch or the successive touch motions detected on the touch screen 190 under control of the controller 110.

The vibration motor 164 may convert an electric signal into mechanical vibration under control of the controller 110. For example, the vibration motor 164 may include a linear vibration motor, a bar type vibration motor, a coin type vibration motor or a piezoelectric vibration motor. When a voice call request is received from another portable apparatus (not shown), the vibration motor 164 of the portable apparatus 100 operates in a vibration mode under control of the controller 110. One or a plurality of vibration motors 164 may be provided in the portable apparatus 100. Also, the vibration motor 164 may vibrate the whole of the portable apparatus 100 or may vibrate only a part of the portable apparatus 100.

According to an exemplary embodiment, the vibration motor 164 may output a tactile feedback corresponding to the touch or the successive touch motions detected on the personal screen, the common screen or the management screen under control of the controller 110. Also, the vibration motor 164 may provide various tactile feedbacks using, for example, vibration intensity and vibration lasting time based on a control command of the controller 110.

The connector 165 may be used as an interface for connecting the portable apparatus 100 with an external device (not shown) or a power source (not shown). Under control of the controller 110, the portable apparatus 100 may transmit data stored in the storage 175 to the external device through a wired cable connected to the connector 165, or receive data from the external device. Further, the portable apparatus 100 may receive power from a power source (not shown) through the wired cable connected to the connector 165, or charge the battery (not shown). Also, the portable apparatus 100 may connect with an external accessory (e.g., a keyboard dock, not shown) through the connector 165.

The key pad 166 may receive a key input from a user to control the portable apparatus 100. The key pad 166 may include, for example, a physical key pad (not shown) provided on the front side 100a of the portable apparatus 100, a virtual key pad (not shown) displayed on the touch screen 190 and a wireless-connectable physical key pad (not shown). It will be appreciated by those skilled in the art that the physical key pad (not shown) on the front side 100a of the portable apparatus 100 may not be provided in accordance with the performance or the structure of the portable apparatus 100.

The touch input unit 167 may be used to touch or select an object (e.g., a menu, a text, an image, video, a figure, an icon and a shortcut icon) displayed on the touch screen 190 or the education application of the portable apparatus 100. Also, the touch input unit 167 may be used to touch or select contents (e.g., a text file, an image file, an audio file, a video file or a reduced student personal screen) displayed on a screen (e.g., a personal screen, a common screen, a management screen, etc.) displayed on the touch screen 190 or the education application of the portable apparatus 100. Further, the touch input unit 167 may be used to input a character or the like by touching an electrostatic capacitive, resistive or electromagnetic induction touch screen, or by a virtual keyboard. For example, the touch input unit 167 may include a stylus or a haptic pen in which an internal pen vibration device (not shown, e.g., a vibration motor or an actuator) vibrates based on control information received through, for example, the communication unit of the portable apparatus 100. Alternatively, the vibration device may vibrate not based on control information received from the portable apparatus 100 but based on sensing information detected by a sensor (e.g., an acceleration sensor (not shown)) embedded in the touch input unit 167. It will be easily understood by those skilled in the art that the touch input unit 167 insertable in an insertion hole of the portable apparatus 100 may not be provided in accordance with the performance or structure of the portable apparatus 100.

The sensor unit 170 includes at least one sensor for detecting the state of the portable apparatus 100. For example, the sensor unit 170 may include the proximity sensor 171 positioned on the front side 100a of the portable apparatus 100 and detecting proximity of an object to the portable apparatus 100; the illumination sensor 172 for detecting the intensity of light around the portable apparatus 100; the gyro sensor 173 for detecting a direction based on rotational inertia of the portable apparatus 100; an acceleration sensor (not shown) for detecting gradients of three axes (e.g., an x axis, a y axis and a z axis) applied to the portable apparatus 100; a gravity sensor for detecting a direction of gravity; or an altimeter for measuring atmospheric pressure and detecting height.

The sensor unit 170 may measure acceleration based on the kinetic acceleration and the gravitational acceleration of the portable apparatus 100. The sensor unit 170 may measure only the gravitational acceleration when the portable apparatus 100 is not in motion. For example, when the front side 100a of the portable apparatus 100 is faced upward, the gravitational acceleration may be determined to be in a positive (+) direction. On the other hand, when the rear side 100c of the portable apparatus 100 is faced upward, the gravitational acceleration may be determined to be in a negative (−) direction.

At least one sensor included in the sensor unit 170 detects the state of the portable apparatus 100 and generates a signal corresponding to the detected state. The generated signal may be transmitted to the controller 110. It will be easily appreciated by those skilled in the art that the sensor of the sensor unit 170 may be added or removed in accordance with the performance of the portable apparatus 100.

The storage 175 may store a signal or data input and/or output corresponding to operations of the mobile communication unit 120, the sub communication unit 130, the multimedia unit 140, the camera unit 150, GPS unit 155, the input and/or output unit 160, the sensor unit 170, and the touch screen 190 under control of the controller 110. The storage 175 may store a GUI related to a control program for control of the portable apparatus 100 or the controller 110 or an application provided by a manufacturer or downloaded from the external source, images for providing the GUI, user information, a document, database or related data.

According to an exemplary embodiment, the storage 175 may store an object displayed on the personal screen, the common screen, the management screen, contents, various sub screens displayed on the personal screen, personal screen information for layout of the personal screen, various sub screens displayed on the common screen, the common screen information for layout of the common screen, various sub screens displayed on the management screen, the management screen information for layout of the management screen, apparatus information of the portable apparatus, a user identification information education application for login to the education application, etc. The storage may store the personal screen or the common screen received from a different portable apparatus. The personal screen or the common screen previously stored in the storage may be updated under control of the controller 110. The storage 175 may store touch information (e.g., X and Y coordinates of a detected touch position, touch detection time, etc.) corresponding to the touch and/or successive touch motions or hovering information corresponding to hovering (e.g., X and Y coordinates of hovering, hovering time, etc.). The storage 175 may store the kind of successive touch motions (e.g., flick, drag or drag and drop).

The storage 175 may store a user recognizable visual feedback (e.g., a video source or the like) corresponding to an input touch or an input touch gesture and to be output to the touch screen 190, a user recognizable aural feedback (e.g., a sound source or the like) to be output to the speaker 163, and a user recognizable tactile feedback (e.g., a haptic pattern or the like) to be output to the vibration motor 164.

According to an exemplary embodiment, the term "storage" is understood as including not only the storage 175 but also the ROM 112 and the RAM 113 in the controller 110 or a memory card (not shown)(e.g., a micro secure digital (SD) card, a memory stick) mounted to the portable apparatus 100. The storage 175 may include a non-volatile memory, a volatile memory, a hard disk drive (HDD), or a solid state drive (SSD).

The power supply 180 may supply power to one or a plurality of batteries (not shown) placed inside the portable apparatus 100 under control of the controller 110. The one or a plurality of batteries (not shown) are placed between the rear side 100c of the portable apparatus 100 and the touch screen 190 placed in the front side 100a of the portable apparatus 100. Also, the power supply 180 may supply the portable apparatus 100 with the power input from an external power source (not shown) through a wired cable connected with the connector 165 under control of the controller 110.

The touch screen 190 may provide a user with a GUI corresponding to various services (e.g., a call, data transmission, broadcasting, photographing, a moving picture, or an application). The touch screen 190 transmits an analog signal corresponding to a single touch or multi touches input through the GUI to the touch screen controller 195. The touch screen 190 may receive the single touch or the multi touches through the touch input unit 167 or a user's body (e.g., a thumb and other fingers).

According to an exemplary embodiment, the touch is not limited to contact between the touch screen 190 and the user's body or the touch input unit 167 and may include noncontact (e.g., a hovering motion at a distance of 30 mm or shorter from the touch screen). It will be appreciated by those skilled in the art that the distance at which the hovering motion becomes detectable on the touch screen 190 may be varied depending on the performance or the structure of the portable apparatus 100.

For example, the touch screen 190 may be achieved by a resistive method, an electrostatic capacitive method, an infrared method, or an acoustic wave method.

The touch screen controller 195 converts an analog signal corresponding to a single touch or multi touches received on the touch screen 190 into a digital signal (e.g., X and Y coordinates corresponding to the detected touch position) and transmits the digital signal to the controller 110. The controller 110 may calculates X and Y coordinates corresponding to the touched position on the touch screen 190, based on the digital signal received from the touch screen controller 195. Also, the controller 110 may control the touch screen 190 in accordance with the digital signal received from the touch screen controller 195. For example, the controller 110 may control a shortcut icon 191e (refer to FIG. 2) selected in response to the input touch to be displayed on the touch screen 190 distinguishably from the other shortcut icons (e.g., 191a to 191d) or control an application (e.g., a Smart School) corresponding to the selected shortcut icon 191e to be executed and displayed on the touch screen 190.

According to an exemplary embodiment, a single or a plurality of touch screen controllers 195 may control a single touch screen 190 or a plurality of touch screens 190 (not shown). In accordance with the performance or the structure of the portable apparatus 100, the touch screen controller 195 may be involved in the controller 110.

In accordance with the performance of the portable apparatus 100, at least one element may be added to or removed from the elements shown in the portable apparatus 100 of FIG. 1. Also, it will be appreciated by those skilled in the art that the positions of the elements may be varied depending on the performance or the structure of the portable apparatus 100.

Referring now to FIGS. 1 to 3, the touch screen 190 is placed at a center portion of the front side 100a of the portable apparatus 100. FIG. 2 illustrates that an example of a home screen 191 which appears when a user unlocks the screen of the portable apparatus 100 is displayed on the touch screen 190. The portable apparatus 100 may have a plurality of home screens different from one another. On the home screen 191, the shortcut icons 191a to 191h corresponding to applications selectable by touch, for example, S-Note, Internet, Samsung Apps, Play, Smart School, Tmap, Melon, Hoppin, etc., may be displayed. Although not shown, the applications may further include a weather widget and a clock widget. At a lower portion of the home screen 191, a status bar 192 showing, for example, a battery charge state or reception strength of the portable apparatus 100 may be displayed. Also, in accordance with an operating system (OS), the portable apparatus 100 may display the status bar 192 at an upper portion of the home screen 191, or alternatively, may not display the status bar 192.

At an upper portion of the front side 100a of the portable apparatus 100, the first camera 151, the plurality of speakers 163a and 163b, the proximity sensor 171 and the illumination sensor 172 may be positioned. On the rear side 100c of the portable apparatus 100, the second camera 152 and the flash 153 may be selectively provided.

On the front side 100a of the portable apparatus 100, at the lower portion of the home screen 191 within the touch screen 190, the home button 161a, the menu button (not shown) and the back button 161b are positioned. Thus, the button 161 may be implemented not only by a physical button but also by a touch button. Also, the touch button of the button 161 may be displayed together with a text or an icon within the touch screen 190.

On the front side 100b of the portable apparatus 100, the power/lock button 161c, the volume button 161d, one or plural microphones 162, etc. may be provided. The connector 165 provided on a bottom lateral side of the portable apparatus 100 may be connected to the external device by, for example, a wire. Also, the bottom lateral side of the portable apparatus 100 may be provided with an insertion hole to which the touch input unit 167 having a button 167a can be inserted. The touch input unit 167 may be received in or withdrawn from the portable apparatus 100 through the insertion hole.

Figure 4:
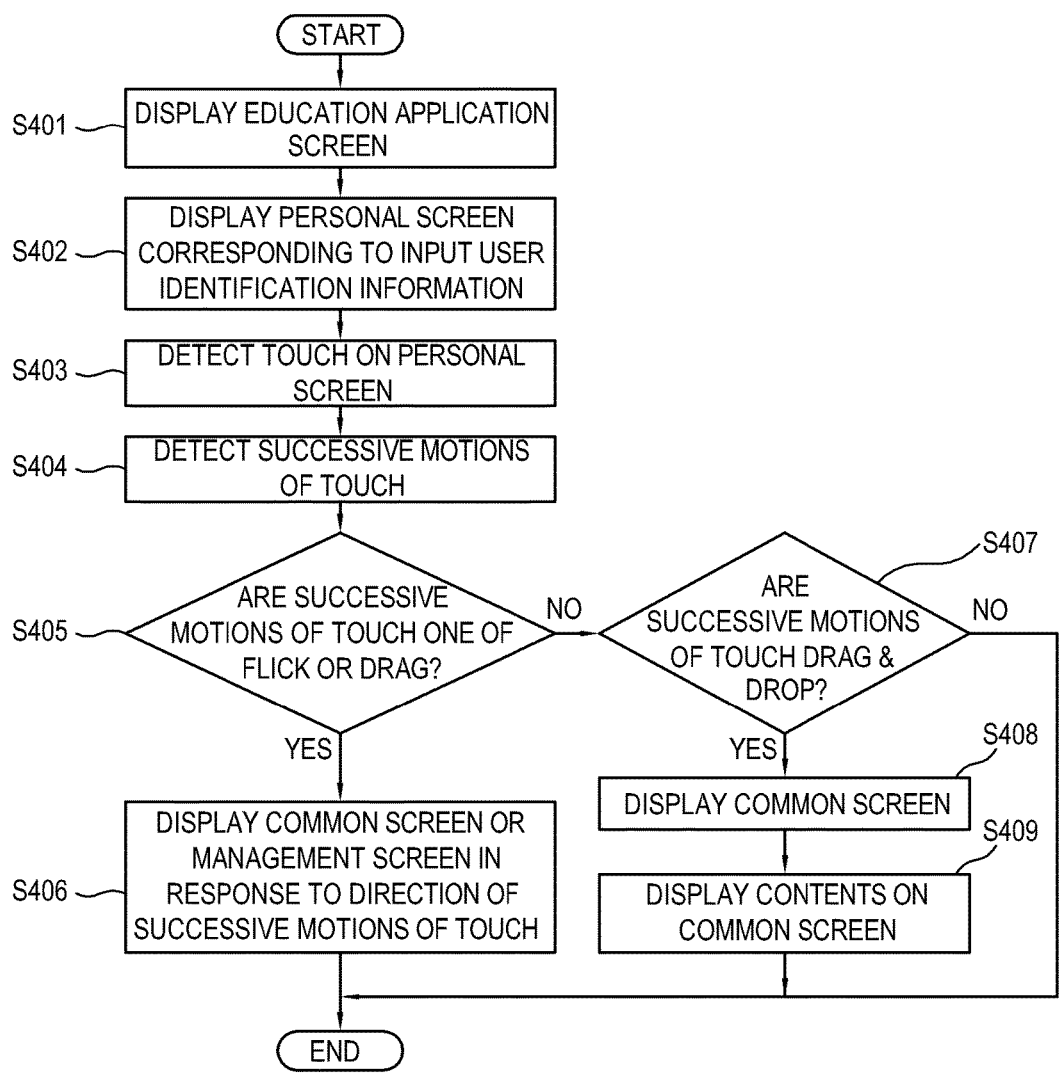
FIG. 4 is a schematic flowchart showing a screen displaying method of a portable apparatus according to an exemplary embodiment.

FIG. 4 is a schematic flowchart showing a screen displaying method of a portable apparatus according to an exemplary embodiment.

Figure 5:
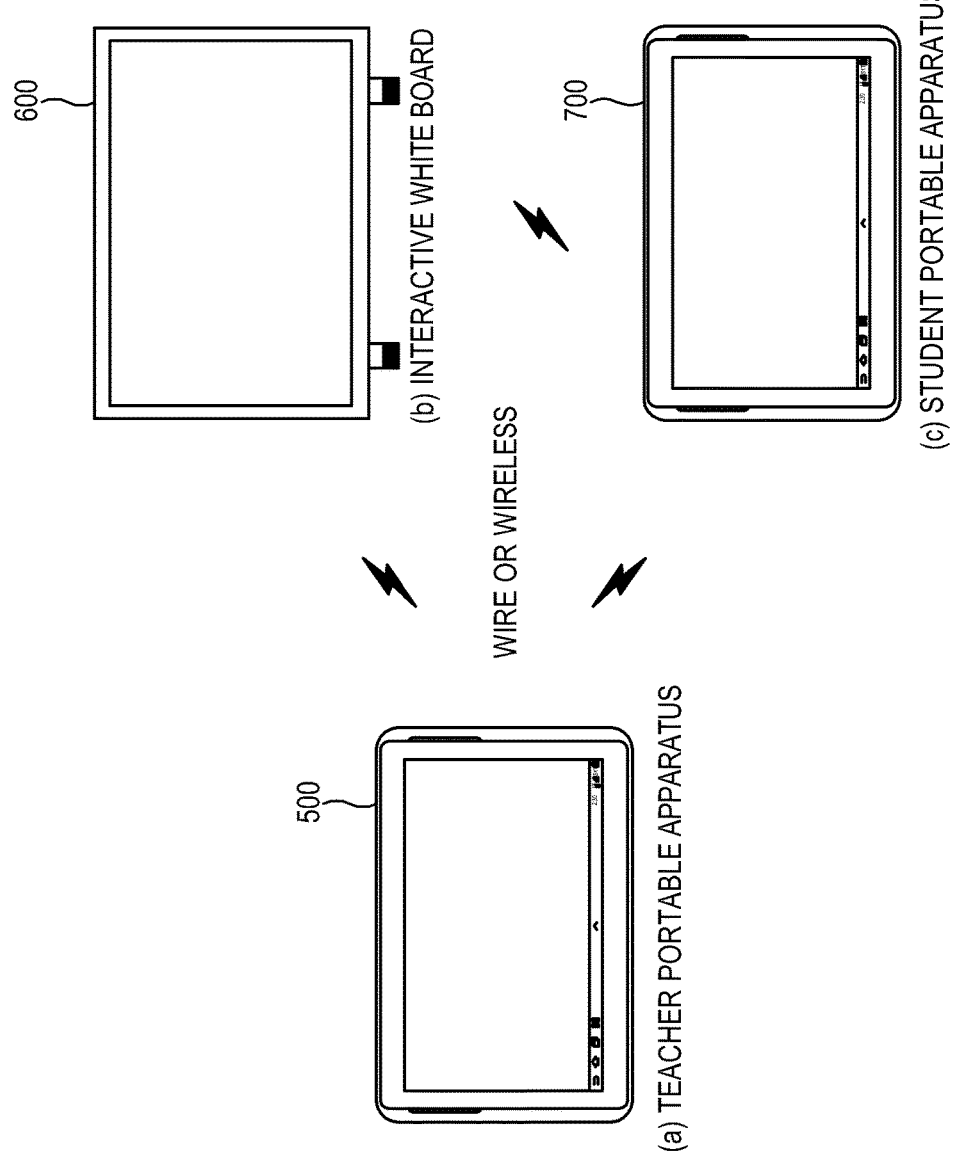
FIG. 5 is a schematic view showing connection between an interactive white board and a portable apparatus according to an exemplary embodiment.

FIG. 5 is a schematic view showing connection between an interactive white board and a portable apparatus according to an exemplary embodiment.

Figure 6:
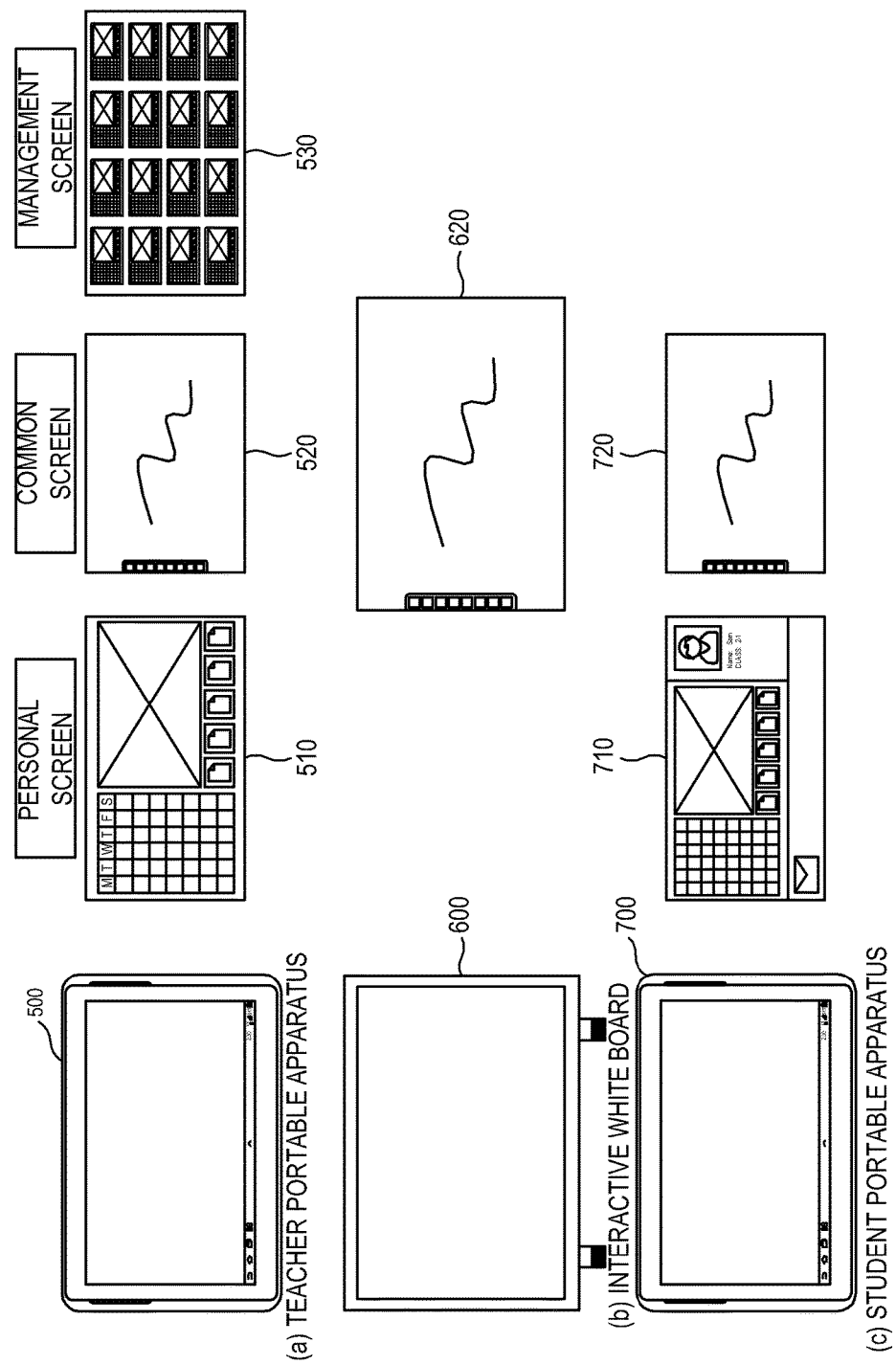
FIG. 6 is a view showing an example of a screen of a portable apparatus according to an exemplary embodiment.

FIG. 6 is a view showing an example of a screen of a portable apparatus according to an exemplary embodiment.

Figure 7:
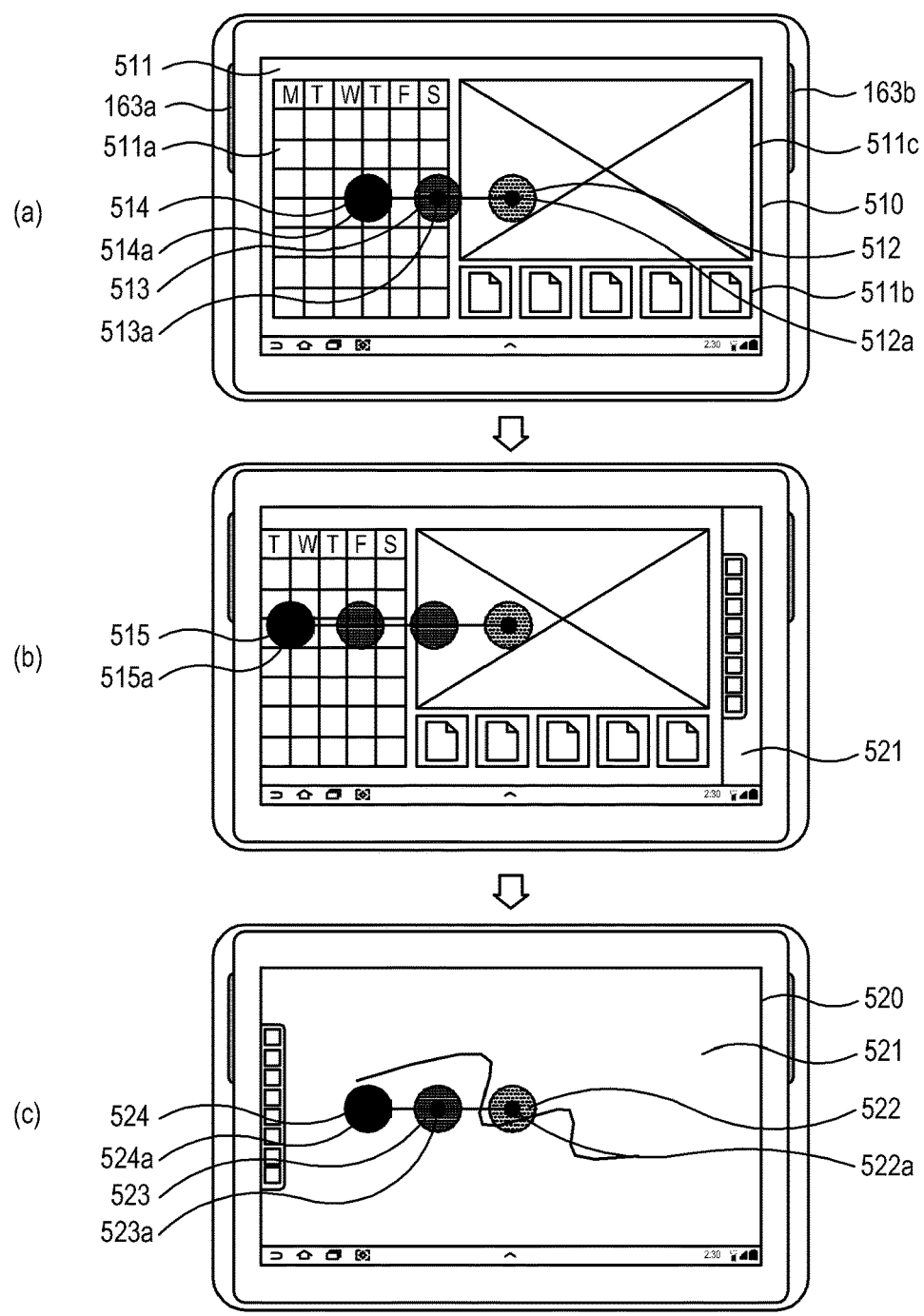
FIGS. 7 and 8 are views showing an example of a screen displaying method in a portable apparatus according to an exemplary embodiment.
Figure 8:
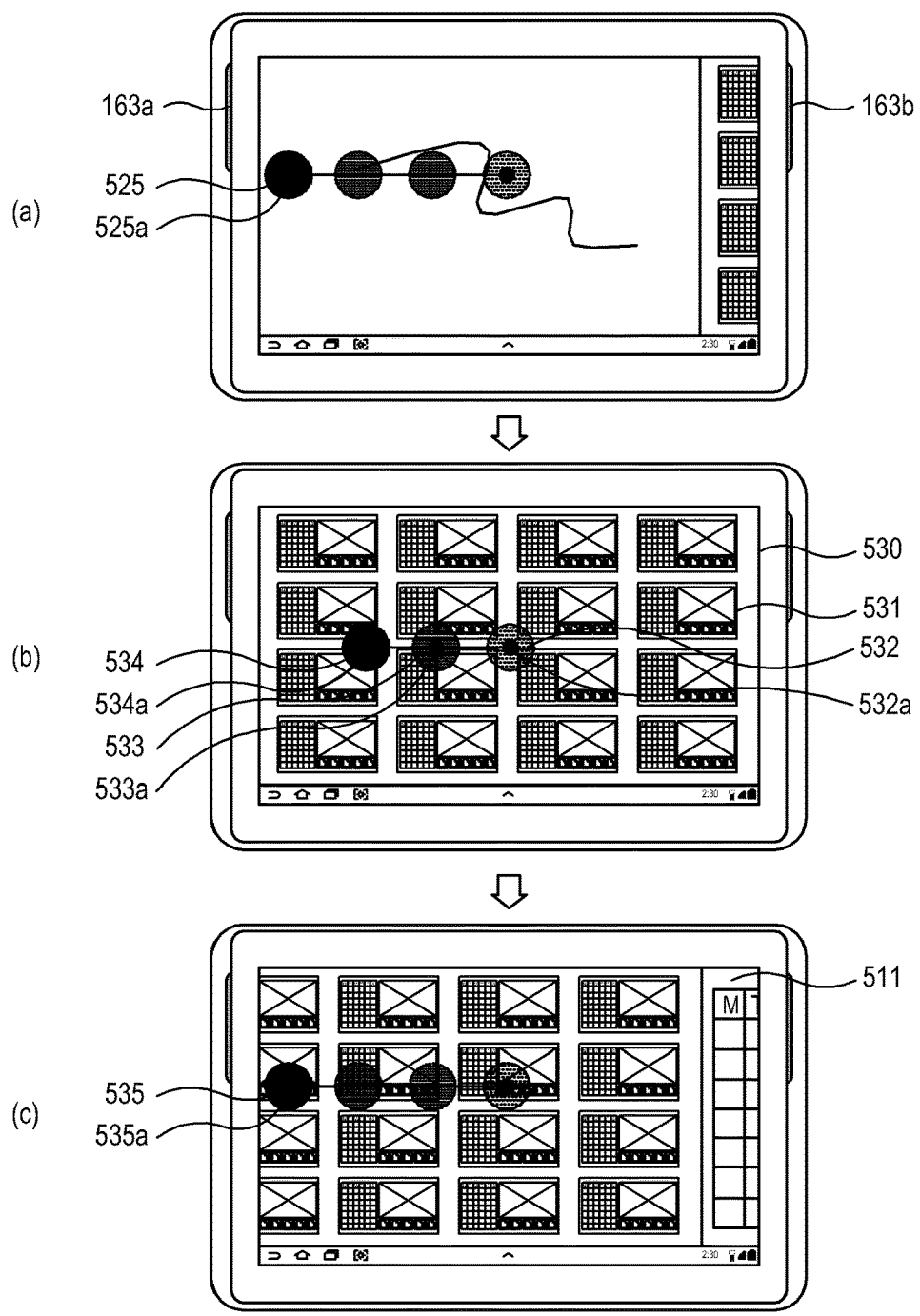

FIGS. 7 and 8 are views showing an example of a screen displaying method of a portable apparatus according to an exemplary embodiment.

At operation S401 of FIG. 4, an education application screen is displayed on the touch screen.

Referring to FIG. 2, the shortcut icon 191*e* corresponding the education application, e.g., Smart School, is displayed on the touch screen 190. When the shortcut icon 191*e* corresponding to the education application is selected, the education application screen may be displayed on the touch screen.

Referring to FIGS. 5 and 6, the education application may operate in a system including a teacher portable apparatus 500, an interactive white board 600 and at least one student portable apparatus 700. Under the above system, the education application may refer to an education solution program where hardware, software, service and various educational applications of the portable apparatus 100 are packaged. For illustrative purposes, it is assumed that the teacher portable apparatus 500, the interactive white board, and the student portable apparatus 700 may have substantially the same or similar configuration as that of the portable apparatus 100 described with respect to FIGS. 1 to 3.

The teacher portable apparatus 500, the interactive white board 600 and the student portable apparatus 700 may be wirelessly connected directly through using communication units thereof (e.g., an ad-hoc mode) or may be connected via an access point (AP) (e.g., an infra-structure mode). Also, the teacher portable apparatus 500, the interactive white board 600 and the student portable apparatus 700 may be connected by a wire through the connector 165. A controller of the teacher portable apparatus 500, a controller of the interactive white board 600 and a controller of the student portable apparatus 700 may request for a personal screen or a common screen through the communication unit thereof. Also, the controller of the teacher portable apparatus 500, the controller of the interactive white board 600 and the controller of the student portable apparatus 700 may transmit the requested personal or common screen through the communication unit thereof. The management server (not shown) may be connectable with the teacher portable apparatus 500, the interactive white board 600 and the student portable apparatus 700 and provide class management and learning management.

The wireless communication may include, for example, wireless LAN (Wi-Fi), bluetooth, zigbee, Wi-Fi direct (WFD), Ultra Wideband (UWB), infrared data association (IrDA), bluetooth low energy (BLE), near field communication (NFC), etc., but not limited thereto.

The teacher portable apparatus 500, the interactive white board 600 and at least one student portable apparatus 700 may transmit and/or receive apparatus information such as identification information, information about a supportable communication method, current status information, service information, etc. to and/or from one another. It will be appreciated by those skilled in the art that the teacher portable apparatus 500, the interactive white board 600 and the student portable apparatus 700 may transmit and/or receive the personal screen, transmit and/or receive the common screen, or transmit and/or receive the apparatus information.

The education application may use the portable apparatus 100 and the interactive white board 600 to access various educational applications and a website. The education application may provide screen sharing between a teacher and a student, learning material and real-time schedule sharing, facilitating of the student's collaborative learning, real-time question and test between the teacher and the student, test result sharing between the teacher and the student, student attendance, and a test result database (DB).

It will be appreciated by those skilled in the art that the teacher portable apparatus 500, the interactive white board 600 and at least one student portable apparatus 700 may be added, deleted or modified in accordance with the number of the teacher and the student in a class.

At operation S402 of FIG. 4, the personal screen is displayed corresponding to input user identification information.

Referring to FIG. 6, the controller displays a login screen (not shown) of the education application in response to a touch input by a user (e.g., a teacher, a student) on the shortcut icon 191*e* corresponding to the education application. Through the login screen (not shown), identification (ID) and a password of the user may be input. When receiving the user's login information (e.g., the ID and the password), the controller displays the personal screen corresponding to the user corresponding to the received login information. For example, when the user is a teacher, the controller displays the personal screen for a teacher. Further, when the user is a student, the controller displays the personal screen for a student. The login information input through the login screen may be remembered so that the user may easily log into the personal screen through the stored login information.

When the user is a teacher, the controller of the teacher portable apparatus 500 displays personal screen 510. The personal screen 510 may include a sub personal screen displayable on the personal screen 510, for example, a class generating screen (not shown) for generating the user's own class before the class starts, a lecture screen 511 (refer to FIG. 7(*a*)) for displaying and/or selecting contents (a teaching material, a test paper or homework) needed for the class, a student setup (not shown) for setting up a student to be participated in the class and forming a student group needed for the class, and a management screen (not shown) for systematically managing a student's personal information, e.g., a student's test scores, a list of activities, a timetable, etc. Referring to FIG. 7(*a*), the lecture screen 511 may include a class timetable 511*a* showing a week's class schedule of a teacher, a reduced content region 511*b* where various contents needed for a class are reduced and displayed, or a content display region 511*c* where the content selected in the reduced content region 511*c* is enlarged and displayed.

The personal screen 510 may include a correction screen (not shown) for correcting and guiding homework or a test handed in by students. A teacher's correcting and guiding contents are stored in a server, and managed in synchronization with contents (e.g., a teaching material, a test paper or homework).

The personal screen 510 may provide a sharing screen (not shown) in which data prepared by a teacher can be shared with other teachers. Thus, a teacher can reduce time to prepare a teaching plan and a teaching material through data sharing of the sharing screen, and enhance quality of prepared contents through communication with other teachers. The contents may include various objects (e.g. a menu, a text, an image, a video, a figure, an icon and a shortcut icon).

The controller of the teacher portable apparatus 500 may provide a teacher the common screen 520 as a screen of the interactive white board 600 connectable with the teacher portable apparatus 500. The common screen 520 may for example include a class screen 520 where contents needed for a class is displayed and written on the whiteboard, and a test screen (not shown) where an examination question for a student and the student's answers therefor are displayed. Also, the common screen 520 is a screen displayed in response to successive touch motions (e.g., a touch gesture) input on the personal screen 510.

The controller of the teacher portable apparatus 500 may offer a teacher management screen 530 (refer to FIG. 6). The management screen 530 may for example include a reduced screen 531 where a personal screen 710 displayed on the student portable apparatus 700 in a class is monitored, reduced and displayed, an enlarged screen (not shown) for one of the reduced personal screens 710, and a lock screen (not shown) for locking a screen of the student portable apparatus 700 in the class.

The management screen 530 is a screen in response to successive touch motions (e.g., touch gesture) input on the common screen 520. Also, the personal screen 510 may be displayed in response to the touch successive motions input on the management screen 530. The personal screen 510, the common screen 520 and the management screen 530 may be changed in response to the touch gesture in a certain direction.

The controller of the interactive white board 600 may offer a teacher and a student the common screen 620. The common screen 620 may show various contents transmitted from the teacher portable apparatus 500 in accordance with interaction with the connectable teacher portable apparatus 500. The interactive white board 600 may show writing on the board, which is input by the teacher, for example, a touch using the input unit, on the contents displayed on the common screen 620. Also, the interactive white board 600 may display various contents transmitted from the student portable apparatus 700 in accordance with interaction with the connectable student portable apparatus 700.

When the user is a student, the controller of the student portable apparatus 700 may offer the student the personal screen 710. The personal screen 710 may include a sub personal screen displayable on the personal screen 510, for example, a learning screen (not shown) where contents received from the connectable teacher portable apparatus 500 are shown and/or written in real time, a test screen (not shown) where a test question received from the teacher portable apparatus 500 is solved, and a personal setup screen (not shown) where personal information of the student is set up.

The controller of the student portable apparatus 700 may offer the student the common screen 720 received from the interactive white board 600 connectable with the student portable apparatus 700. The common screen 720 is a screen displayed in response to successive touch motions (e.g., touch gesture) input on the personal screen 710.

The common screens 520, 620 and 720 displayable on the portable apparatuses 500 to 700 may include the same screen.

At operation S403 of FIG. 4, a touch is detected on the personal screen.

Referring to FIGS. 7(a) and 7(b), a touch of a user (e.g., a teacher) is detected on the personal screen 511. The controller detects a touch 512 on the personal screen 511 through the touch screen 190 and the touch screen controller 195. The controller 110 receives position information (e.g., X and Y coordinates corresponding to a touch position 512a of the touch 512) corresponding to the touch 512 from the touch screen controller 195.

The controller 110 may store the received position information about a touch on the touch screen 190, a touch detection time (e.g., at 2:30 P.M.), and touch information (e.g., touch duration time, touch pressure, etc.) corresponding to the touch in the storage 175. The touch 512 detected on the personal screen 511 may be generated by, for example, one of a thumb and other fingers or by the touch input unit 167.

According to another exemplary embodiment, a touch may be detected in another position (e.g., the class timetable 511a or the reduced content region 511b) of the personal screen 520. Referring to FIG. 9(a), the controller 110 detects a touch 541 on the reduced content 540 of the reduced content region 511b through the touch screen 190 and the touch screen controller 195. The controller 110 receives the position information (e.g., X and Y coordinates corresponding to the touch position 541a of the touch 541) corresponding to the touch 541 from the touch screen controller 195.

The controller 110 may store the received position information about a touch on the touch screen 190, a touch detection time (e.g., at 2:30 P.M.), and touch information (e.g., touch duration time, touch pressure, etc.) corresponding to the touch in the storage 175. The touch 512 detected on the personal screen 511 may be generated by, for example, one of a thumb and other fingers or by the touch input unit 167. The controller 110 may recognize information (e.g., a reduced content name, ID, a file size, a file extension, a storage route, etc.) of the reduced content 540 corresponding to the received position information.

At operation S404 of FIG. 4, successive touch motions are detected.

Referring to FIGS. 7(a) and 7(b), successive touch motions 512 are detected on the personal screen 511. The controller may detect successive touch motions 512 in a direction toward, for example, the speaker 163a with respect to the initial touch position 512a toward a final touch position 515a corresponding to a touch 515 through the touch screen 190 and the touch screen controller 195. The controller receives a plurality of position information corresponding to successive touch motions 512 (e.g., a plurality of X and Y coordinates corresponding to successive touches from the initial touch position 512a to the final touch position 515a) from the touch screen controller 195.

The successive touch motions 512 may include successive touch motions in a direction toward the speaker 163a positioned on a left side portion of the portable apparatus 100 or in a direction toward the speaker 163b positioned on a right side portion of the portable apparatus 100. It will be appreciated by those skilled in the art that the direction of the successive touch motions may be varied depending on embodiments. For example, when the portable apparatus 100 is rotated, the successive touch motions may be in a direction toward the connector 165 or the button 161d provided at the lateral side 100b of the portable apparatus 100.

The successive touch motions 512 may refer to contact continued from the initial touch position 512a through the final touch position 515a. The successive touch motions 512 may also refer to contact continued from the initial touch position 512a to a first intermediate touch position 513a. Also, the successive touch motions 512 may refer to contact continued from the initial touch position 512a to a second intermediate touch position 514a. The first intermediate touch position 513a and the second intermediate touch position 514a are given as an example, and the controller 110 may detect a plurality of touch positions not illustrated but included among the initial touch position 512a, the first intermediate touch position 513a, the second intermediate touch position 514a, and the final touch position 515a.

The successive touch motions 512 may refer to contact continued by a certain distance (e.g., 10 mm) or longer from the initial touch position 512a in a direction toward the final touch position 515a. The distance determined in environment setting (not shown) of the portable apparatus 100 refers to a minimum distance where successive touch motions (e.g., touch gesture) are detected by the controller 110. The distance may be directly input and/or modified by a user through the environment setting.

In accordance with a distance, time or a direction of the successive touch motions 512, the personal screen 511 may be scrolled.

The personal screen 511 may be scrolled in one direction between leftward and rightward directions with respect to the initially detected position 512a corresponding to the direction of the successive touch motions 512. When the portable apparatus 100 is rotated, the personal screen 511 may be scrolled in one direction between upward and downward directions.

The touch gesture corresponding to the successive touch motions 512 includes flick or drag, and is not limited thereto as long as the personal screen 511 may be scrolled in response to the touch gesture. In the environment setting (not shown) of the portable apparatus 100, one of flick or drag may be selected and/or changed through change of the touch gesture (not shown).

The controller 110 may offer feedback to a user in response to detection of the successive touch motions 520. Here, the feedback may be offered to a user in the form of one from among a visual feedback, an aural feedback and a tactile feedback. The controller 110 may offer a combination of a visual feedback, an aural feedback and a tactile feedback to a user.

The visual feedback may display a visual effect (e.g., a separate image or an animation effect such as fadedness applied to the separate image) responding to the detection of the successive touch motions 512 distinguishably from the plurality of objects displayed on the touch screen 190. The aural feedback may be sound responding to the detection of the successive touch motions 512, which may be output from one of the first speaker 163a or the second speaker 163b or both the first speaker 163a and the second speaker 163b. The tactile feedback may be vibration responding to the detection of the successive touch motions 512, which may be output from the vibration motor 164. At least one feedback may be maintained from the initial detection position 512a of the touch 512 to the final touch position 515a of the successive motions 512. In the environment setting (not shown) of the portable apparatus 100, feedback (e.g., at least one of visual feedback, aural feedback, and tactile feedback) may be selected and/or modified corresponding to the successive touch motions. Also, feedback offering time (e.g., 500 msec), during which at least one feedback is offered to a user, may be directly input and/or changed by a user.

At operation S405 of FIG. 4, the successive touch motions determine one of the flick and the drag.

According to an exemplary embodiment, the controller 110 determines whether the input successive touch motions 512 (e.g., touch gesture) are flick or drag. The controller 110 determines whether is the successive touch motions 512 are flick or drag as compared with another touch gesture detectable in the portable apparatus 100 based on the position of the touch 512, the direction or speed of the successive touch motions 512, or presence of an object selected by the touch 512.

It will be easily understood by a person having an ordinary skill in the art that another touch gesture (e.g., rotation, a double tap) is distinguishable from the flick or drag.

At operation S407 of FIG. 4, when the successive touch motions are drag and drop, operations S408 and 409 are performed.

At operation S406 of FIG. 4, the common screen or the management screen 530 is displayed in response to a direction of successive touch motions.

Referring to FIGS. 7(a) to 7(c) and FIGS. 8(a) to 8(c), the controller 110 displays the common screen or management screen 530 in response to a direction of the successive touch motions 512 on the personal screen.

Referring to FIGS. 7(a) and 7(b), the controller 110 scrolls the personal screen 511 in a direction toward the speaker 163a in response to a direction of the successive touch motions 512 (e.g., the successive touch motions from the initial touch position 512a to the final touch position 515a). In response to the successive touch motions 512, the common screen 521 may be scrolled and displayed together with the personal screen 511 on the right side of the personal screen 511.

A point of time at which the common screen 521 appears to be displayed with the personal screen 511 may be dependent on the position of the touch within the successive touch motions. For example, when the successive touch motions 512 passes through the second intermediate touch position 514a, the controller 110 may display the common screen 521 together with the personal screen 511. When the successive touch motions 512 passes through the first intermediate touch position 513a, the controller 110 may display the common screen 521 together with the personal screen 511. Also, the successive touch motions 512 pass through the final touch position 515a, the controller 110 may display the common screen 521 together with the personal screen 511. Also, when the successive touch motions reach a critical region (e.g., a region within 2 cm in a direction from one edge of the touch screen toward a center region of the touch screen), the controller 110 may display the common screen 521 without additional successive touch motions. It will be easily understood by a person having an ordinary skill in the art that the critical region may be changed depending on embodiments (e.g., from 2 cm to 1.5 cm).

When the area of the scrolled personal screen 511 is three times smaller than the area of the common screen 521 scrolled and displayed along with the personal screen 511 (e.g., when the personal screen 511 occupies about 75% of the area of the touch screen and the common screen 521 occupies about 25% of the area of the touch screen), the scroll speed of the common screen 521 may become faster than, e.g., a case where the personal screen 511 and the common screen 521 are first displayed together in response to the successive touch motions.

The scroll speed of the personal screen 511 and the scroll speed of the common screen 521 may be substantially the same (e.g., below ±5% difference as compared with the scroll speed of the personal screen 511).

According to another exemplary embodiment, when the successive touch motions of FIGS. 7(a) and 7(b) may be performed in the opposite direction. Here, the controller 110 scrolls the personal screen 511 toward the speaker 163*b* in response to the direction of the successive touch motions 512 (e.g., the successive touch motions from the initial touch position 515*a* to the final touch position 512*a*). In response to the successive touch motions 512, the management screen 530 may be scrolled and displayed together with the personal screen 511 on the left side of the personal screen 511.

In FIGS. 7(*a*) and 7(*b*), screen change from the entire personal screen 511 into the personal screen 511 together with the common screen 521 in response to the successive touch motions is substantially equal to operation S406 of FIG. 4, and thus repetitive descriptions thereof will be omitted.

A time point at which the management screen 530 appears to be displayed together may be dependent on the position of a specific touch of the successive touch motions. For example, when the successive touch motions 512 pass through the second intermediate touch position 514*a*, the controller 110 may display the management screen 530 together with the personal screen 511. Alternatively, when the successive touch motions 512 pass through the first intermediate touch position 513*a*, the controller 110 may display the management screen 530 together with the personal screen 511. Also, when the successive touch motions 512 reach the touch position of the final touch 515*a*, the controller 110 may display the management screen 530 together with the personal screen 511. Also, when the successive touch motions reach a critical region of the screen (e.g., a region within 2 cm from the center of the touch screen), the controller 110 may display the common screen 521 without additional successive touch motions. It will be appreciated that the critical region may be changed (e.g., from 2 cm into 1.5 cm).

The controller 110 displays the common screen 521 in response to the successive touch motions on the personal screen 511 (e.g., the successive touch motions from the initial touch position 512*a* to the final touch position 515*a*). The common screen 521 may display writing on the board and various contents transmitted from the teacher portable apparatus 500 in accordance with interaction with the connectable teacher portable apparatus 500.

Referring to FIGS. 7(*c*) and 8(*a*), the controller 110 scrolls the common screen 521 toward the speaker 163*a* in response to the direction of the successive touch motions (e.g., the successive touch motions in the direction from the initial touch position 522*a* to the final touch position 525*a*). In response to the successive touch motions 522, the management screen 530 may be scrolled and displayed together with the common screen 521 on the right side of the common screen 521.

In FIGS. 7(*c*) and 8(*a*), screen change from the entire common screen 521 into the common screen 521 together with the management screen 530 in response to the successive touch motions is substantially the same as operation S406 of FIG. 4, and thus repetitive descriptions thereof will be omitted.

According to another exemplary embodiment, the successive touch motions of FIGS. 7(*c*) and 8(*a*) may be performed in the opposite direction. Here, the controller scrolls the common screen 521 toward the speaker 163*b* in response to the direction of the successive touch motions 522 (e.g., the successive touch motions from the initial touch position 524*a* to the final touch position 522*a*). In response to the successive touch motions 522, the personal screen 511 may be scrolled and displayed together with the common screen 521 on the left side of the common screen 521.

Here, screen change from the entire common screen 521 into the common screen 521 together with the personal screen 511 in response to the successive touch motions is substantially the same as operation S406 of FIG. 4, and thus repetitive descriptions thereof will be omitted.

Also, the controller 110 scrolls the management screen 530 in response to the successive touch motions on the common screen 521 (e.g., the successive touch motions from the initial touch position 522*a* to the final touch position 525*a*). The management screen 530 may perform monitoring or screen lock on the student portable apparatus 700 in accordance with interaction with the connectable student portable apparatus 700.

Referring to FIGS. 8(*b*) and 8(*c*), the controller 110 scrolls the management screen 530 toward the speaker 163*a* in response to the direction of the successive touch motions (e.g., the successive touch motions from the initial touch position 532*a* to the final touch position 535*a*). In response to the successive touch motions 532, the personal screen 511 may be scrolled and displayed together with the management screen 530 on the right side of the management screen 530.

In FIGS. 8(*b*) and 8(*c*), screen change from the entire management screen 530 into the management screen 530 together with the personal screen 511 in response to the successive touch motions is substantially the same as operation S406 of FIG. 4, and thus repetitive descriptions thereof will be omitted.

According to another exemplary embodiment, the successive touch motions of FIGS. 8(*b*) and 8(*c*) may be performed in the opposite direction. Here, the controller 110 scrolls the management screen 530 toward the speaker 163*b* in response to the direction of the successive touch motions 532 (e.g., the successive touch motions from the initial touch position 535*a* to the final touch position 532*a*). In response to the successive touch motions 532, the common screen 521 may be scrolled and displayed together with the management screen 530 on the left side of the management screen 530.

Here, screen change from the entire management screen 530 into the management screen 530 together with the common screen 521 in response to the successive touch motions is substantially the same as operation S406 of FIG. 4, and thus repetitive descriptions thereof will be omitted.

Figure 10:
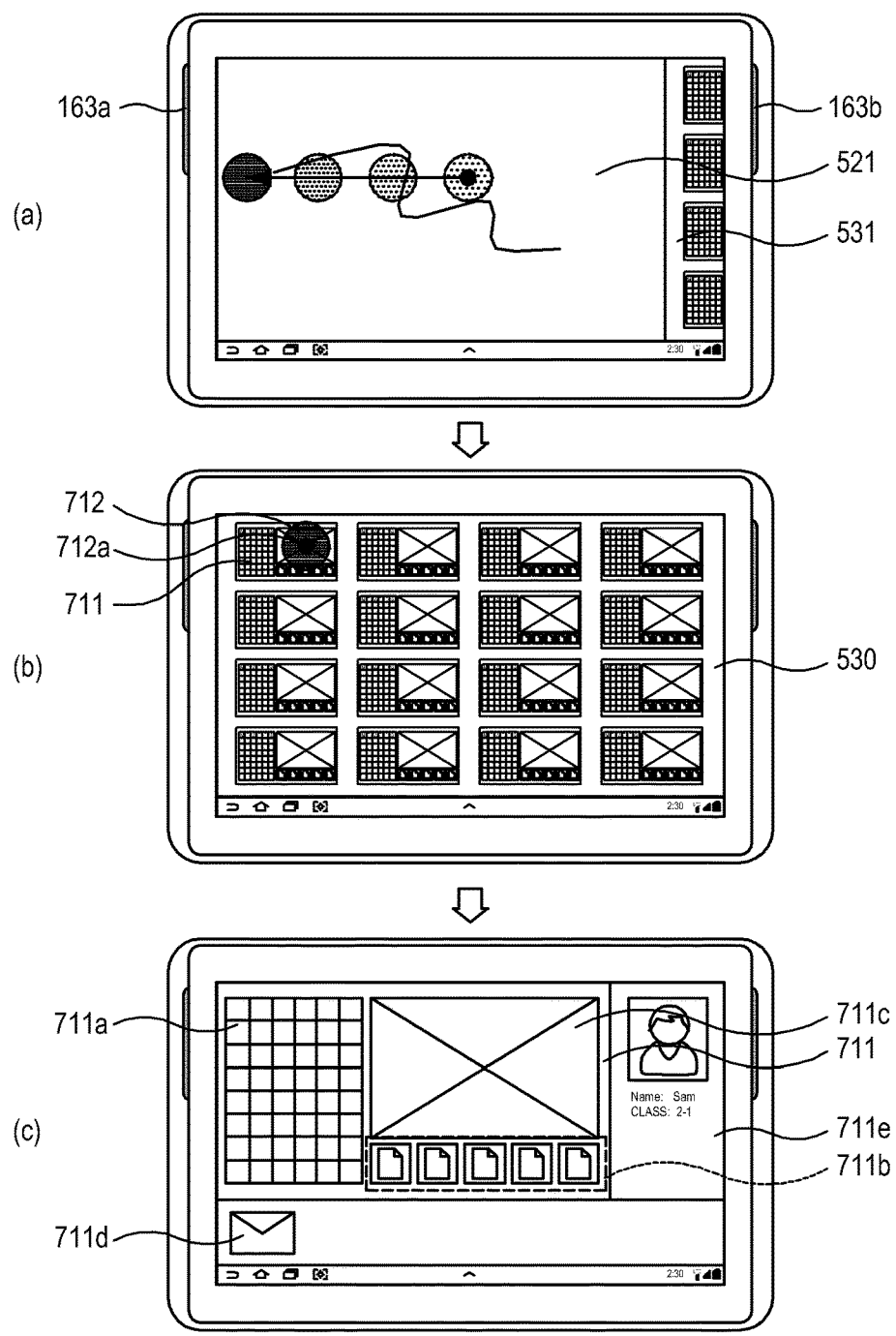
FIG. 10 is a view showing an example of a screen displaying method of a portable apparatus according to another exemplary embodiment.

FIG. 10 is a view showing an example of a screen displaying method of a portable apparatus according to another exemplary embodiment.

Referring to FIGS. 10(*a*) to 10(*c*), the management screen 530 is displayed on the touch screen 190. In FIG. 10A, screen change from the common screen 521 into the entire management screen 530 in response to the successive touch motions is substantially the same as FIG. 8D, and thus repetitive descriptions thereof will be omitted.

On the management screen 530 in which a plurality of reduced student personal screens 711 is displayed, a touch 712 input by a user (e.g., a teacher) is detected. The controller 110 detects the touch 712 on the touch screen 190 and the student personal screen 711 reduced by the touch screen controller 195. The controller 110 receives position information (e.g., X and Y coordinates corresponding to the touch position 712*a*) corresponding to the touch 712 from the touch screen controller 195.

The controller 110 may store the received position information about touch on the touch screen 190, touch detection time (e.g., at 2:30 P.M.), and touch information (e.g., touch duration time, touch pressure, etc.) corresponding to the touch in the storage. The touch 712 detected on the student personal screen 711 may be generated by for example one of a thumb and other fingers or by the touch input unit 167. According to another exemplary embodiment, the touch may be detected on another student's personal screen reduced from the student personal screen 711.

The controller 110 may enlarge and display the student personal screen 711 in response to the input touch 712. For example, the controller 110 may change the management screen 530 into the enlarged student personal screen 711 in response to the touch 712.

Referring to FIG. 10(c), the student personal screen 711 may include a class timetable 711a showing a weekly class schedule of a teacher, a reduced content region 711b where various contents needed for a class are reduced and displayed, a content display region 511c where a content selected in the reduced content region 711c is enlarged and displayed, a message 711d for exchanging a message with a student, or student general information 711e corresponding to the enlarged student personal screen 711. For example, the student general information 711e may include a thumbnail image, ID, a name, a grade/class, attendance, reward and punishment, and contact information of a student. Also, the student general information 711e may be selectively displayed.

At operation S406 of FIG. 4, when the controller displays the common screen or the management screen 530 in response to the direction of the successive touch motions, a screen displaying method of a portable apparatus according to an exemplary embodiment is terminated.

Referring now to operation S405 of FIG. 4, when the successive touch motions is neither of flick nor drag, operation S407 is performed.

Figure 9:
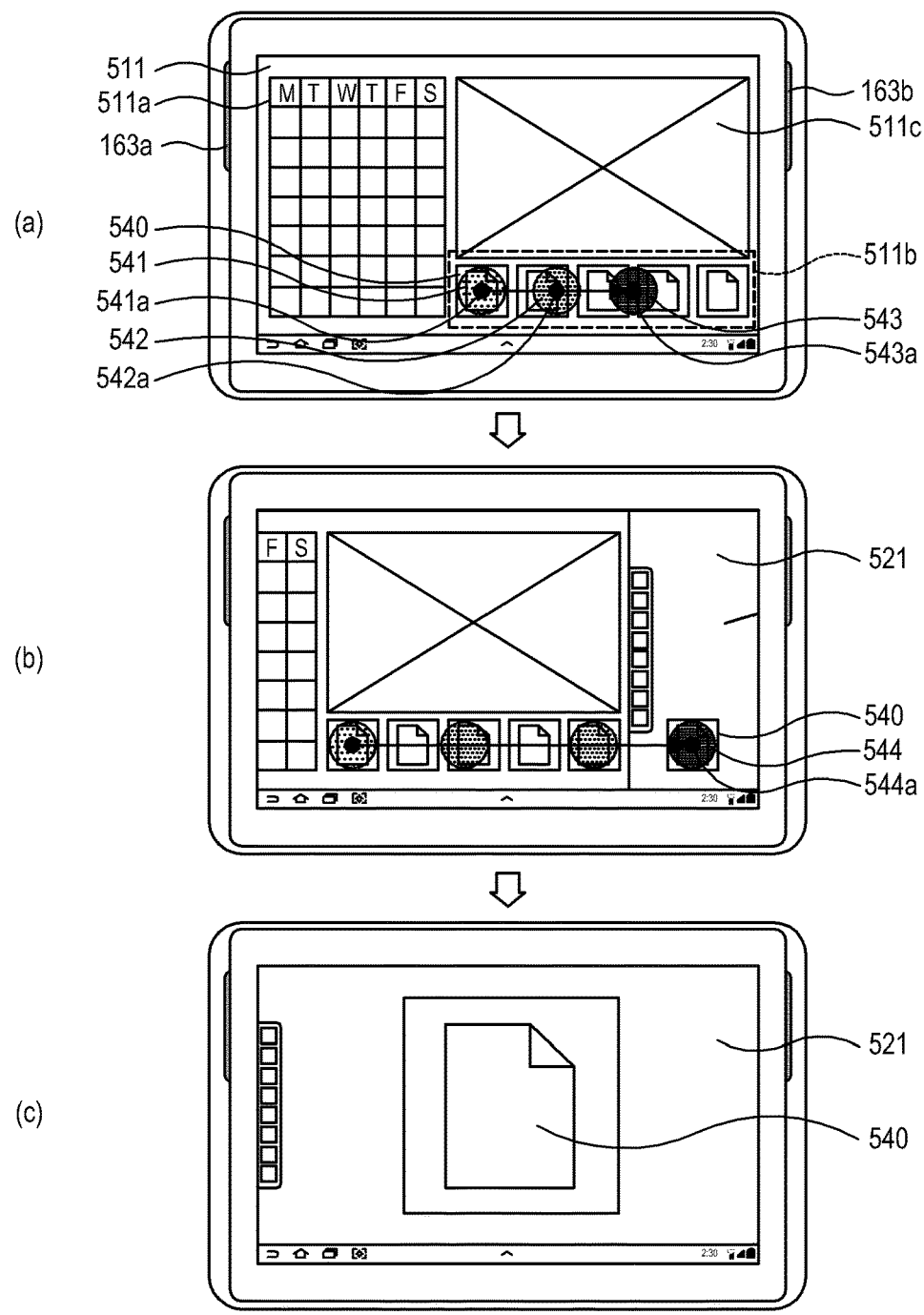
FIG. 9 is a schematic flowchart showing a screen displaying method of a portable apparatus according to another exemplary embodiment.

FIG. 9 is a schematic flowchart showing a screen displaying method of a portable apparatus according to another exemplary embodiment.

At operation S407 of FIG. 4, it is determined whether the successive touch motions are.

Referring to FIG. 9(a), the controller 110 determines whether the successive motions of the input touch 541 are drag and drop. The controller 110 may determine drag and drop as compared with another touch gesture detectable in the portable apparatus 100 based on a position of the touch 541, a direction and speed of successive touch motions 541 (e.g., a direction from the initial touch position 541a to the final touch position 544a) or presence of an object selected by the touch 540, (e.g., reduced contents). The controller may determine drag and drop through movement of the object 540 selected by the touch 541.

It will be easily appreciated by those skilled in the art that drag and drop is distinguishable from another touch gesture.

When the successive motions of the input touch are not drag and drop, a screen displaying method according to an exemplary embodiment is terminated.

At operation S408 of FIG. 4, the common screen is displayed.

Referring to FIG. 9(b), the controller displays the common screen in response to the successive touch motions 541 on the personal screen. The controller 110 scrolls the personal screen 511 toward the speaker 163a in response to the direction of the successive touch motions 541 (e.g., the successive touch motions from the initial touch position 541a to the final touch position 544a) for selecting the reduced content 540. In response to the successive touch motions 541 for selecting the reduced content 540, the common screen 521 may be scrolled and displayed together with the personal screen 511 on the right side of the personal screen 511.

The successive touch motions 541 for selecting the reduced content 540 start from the personal screen 511 and reach the common screen 521. When the final touch position 544a is detected on the common screen 521, the controller may increase the scroll speed of the personal screen 511 and the common screen 521 displayed together. For example, the controller may increase the scroll speed to enlarge and display the reduced contents 540 within the common screen 521. Further, when the final touch position 544a is detected on the common screen 521, the controller may display only the common screen 521 to enlarge and display the reduced contents 540 within the common screen 521.

In FIGS. 9(b) and 9(c), screen change from the personal screen 511 to the entire common screen 521 in response to the successive touch motions is substantially the same as operation S406 of FIG. 4, and thus repetitive descriptions will be omitted.

At operation S409 of FIG. 4, the contents are displayed on the common screen.

Referring to FIG. 9(c), the controller displays the reduced content 540 dragged and dropped to the common screen 521, on the common screen 521. For example, when the reduced content 540 dragged to reach the common screen 521 is dropped, the controller may enlarge and display the reduced content 540 to be displayable on the common screen 521. The content 540 may include a teaching material, a test paper or homework. The content 540 may be displayed on the common screen 620 of the interactive white board 600 and the common screen 720 of the student portable apparatus 700.

At operation S409 of FIG. 4, when the controller displays the contents on the common screen, a screen displaying method of a portable apparatus according to an exemplary embodiment is terminated.

Figure 11:
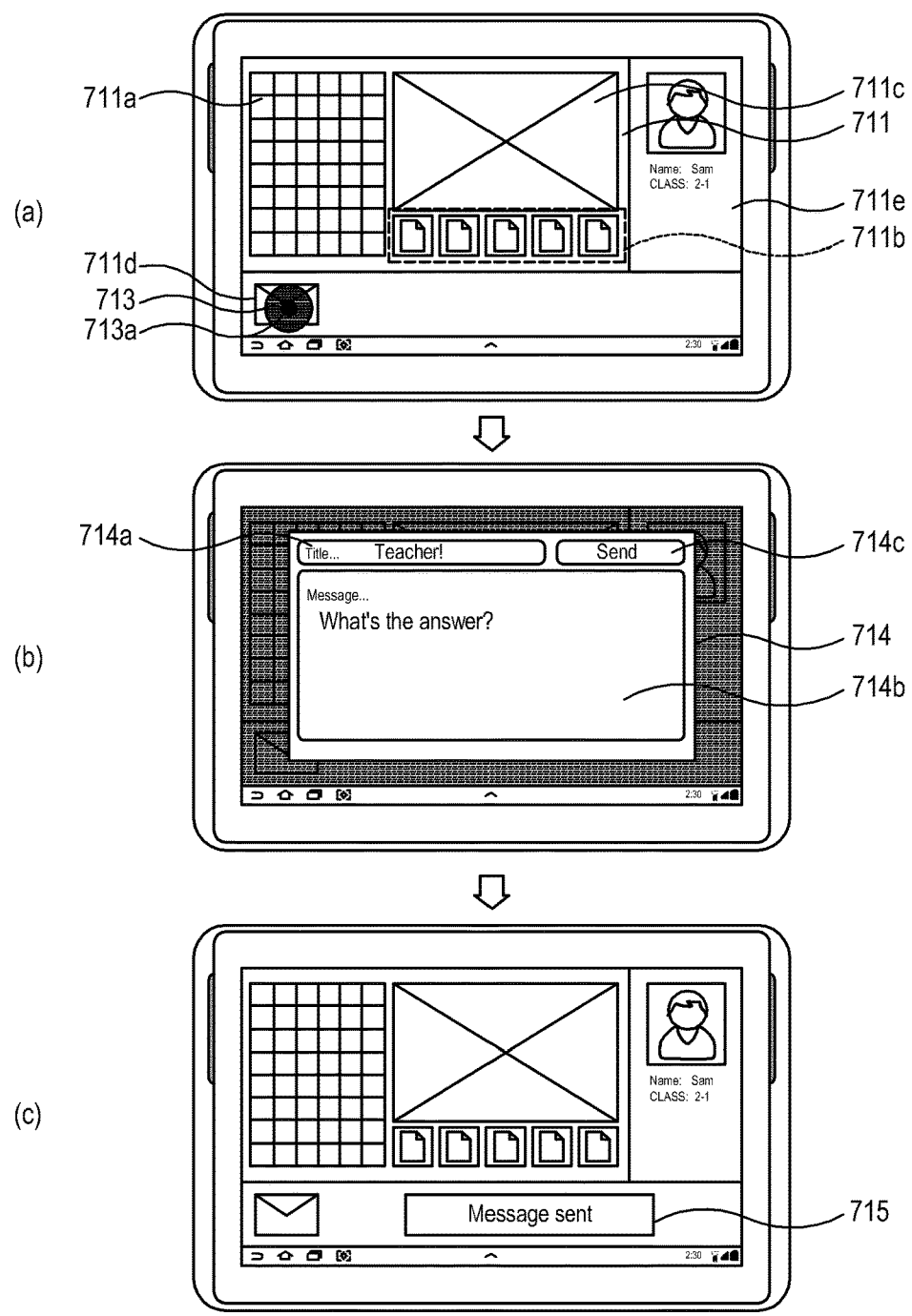
FIGS. 11 and 12 are views showing an example of a screen displaying method between portable apparatuses according to another exemplary embodiment.
Figure 12:
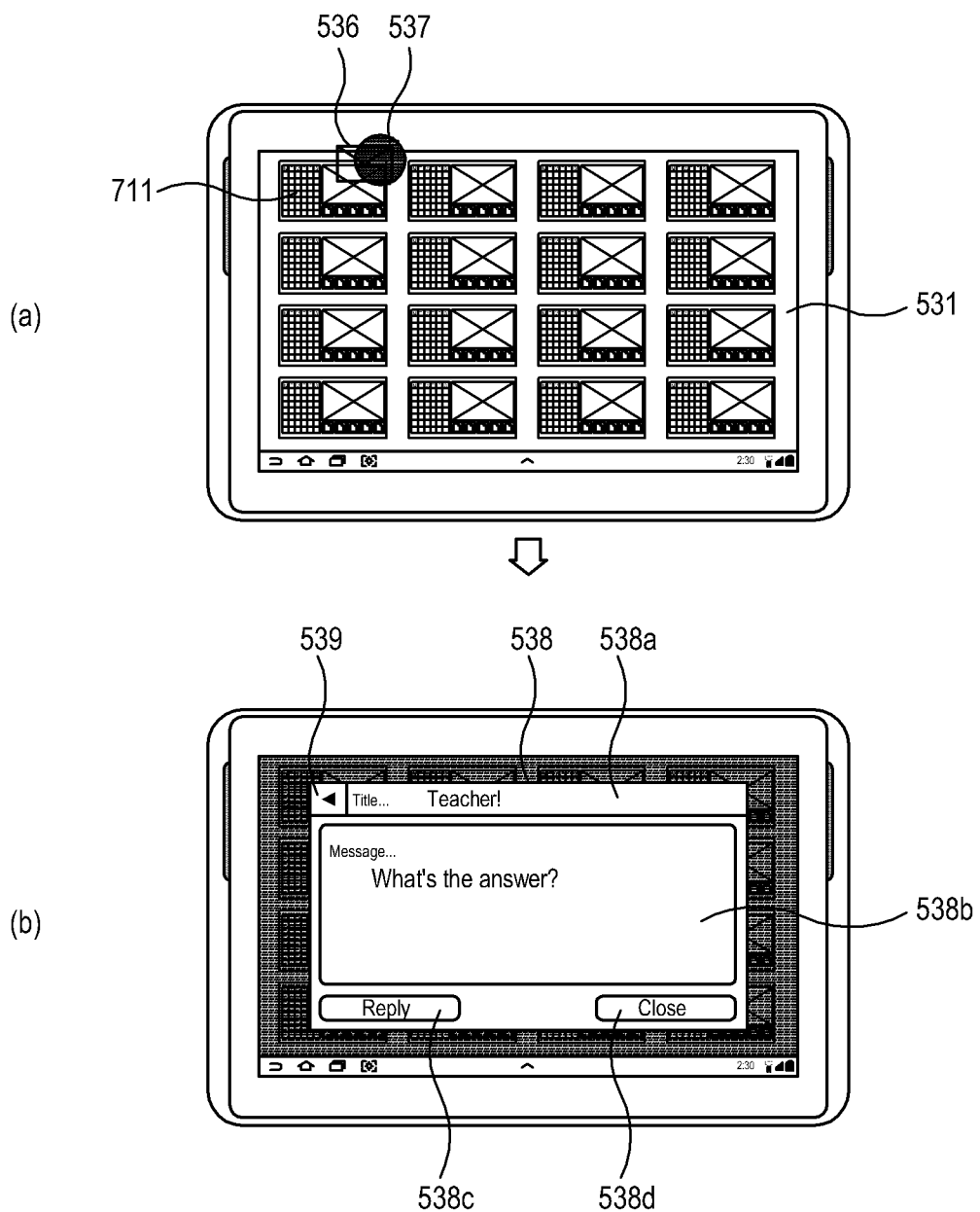

FIGS. 11 and 12 are views showing an example of a screen displaying method between portable apparatuses according to another exemplary embodiment.

Referring to FIG. 11(a), the student personal screen 711 is displayed on the student portable apparatus 700. A touch 713 is detected on a message 711d at a lower portion of the student personal screen 711 (e.g., positioned below the class timetable 711a, the reduced content region 711b, and the content display region 711c). The student general information 711e may be selectively displayed in accordance with settings. The controller 110 detects the touch 713 on the message 711d through the touch screen 190 and the touch screen controller 195. The controller 110 receives position information (e.g., X and Y coordinates corresponding to a touch position 713a of the touch 713) corresponding to the touch 713 from the touch screen controller 195.

The controller 110 may store the received position information about a touch on the touch screen 190, touch detection time (e.g., at 2:30 P.M.), and touch information (e.g., touch duration time, touch pressure, etc.) corresponding to the touch in the storage. The touch 713 detected on the message 711d may be generated by for example one of a thumb and other fingers or by the touch input unit 167.

Referring to FIG. 11(b), the controller 110 may display a message popup window 714 to be overlapped with the student personal screen 711 in response to the touch 713 detected on the message 711d. The message popup window 714 may include a title 714a, a message region 714b for inputting a message to be sent, or a send button 714c. The controller 110 may transmit the title 714a (for example, "Teacher!") and the message written in the message region 714b (e.g., "What's the answer?") to a teacher by using the button 174c.

Referring to FIG. 11(c), when the send button 174C is selected on the message popup window 714, the controller 110 may transmit a message to a teacher. The controller 110 may display a toast 715 (e.g., "message sent") on the personal screen 711. The toast 715 may disappear after a predetermined time (e.g., 2 sec).

Referring to FIG. 12(a), the management screen 530 is displayed on the teacher portable apparatus 500. The message transmitted from the student portable apparatus 700 is received in the teacher portable apparatus 500. The controller 110 displays a message receiving icon 536 corresponding to the message received in the reduced personal screen 711 of the student portable apparatus 700 transmitting the message. Further, a numeral (not shown) corresponding to the number of received messages may be displayed near the displayed message receiving icon 536 (e.g., within 1 cm from the message receiving icon 536). The controller 110 may display another message receiving icon (not shown) corresponding to the message received in the reduced personal screen of another student portable apparatus which transmits the message.

Referring to FIG. 12(b), the controller 110 may display a received message popup window 538 to be overlapped with the management screen 530 in response to a touch 537 detected on the message receiving icon 536. The received message popup window 538 may include a title 538a, a message region 538b, a reply button 538c or a close button 538d. When a message list icon 539 is selected, the controller 110 may display a list (not shown) of messages that have been exchanged between a student and a teacher. For example, the messages are listed in a chronological order, and it is possible to check contents of the message when the corresponding message is selected from the list.

Figure 13:
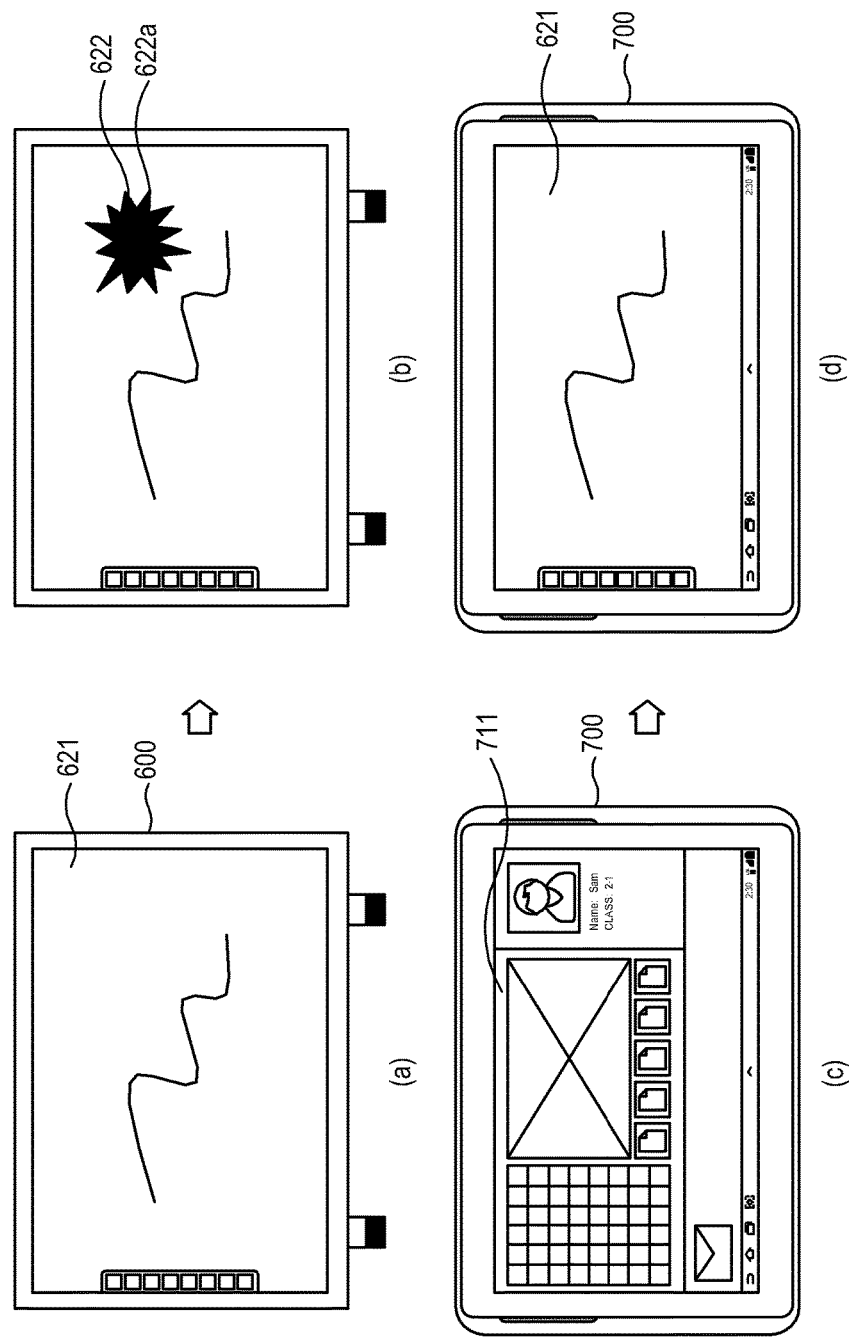
FIG. 13 is a view showing an example of a screen displaying method between portable apparatuses according to another exemplary embodiment.

FIG. 13 is a view showing an example of a screen displaying method between portable apparatuses according to another exemplary embodiment.

Referring to FIGS. 13(a) and 13(b), a teacher leads a class using the interactive white board 600.

To improve students' concentration during class, a teacher may knock on the common screen 621 of the interactive white board 600 with, for example, a finger, a first or the touch input unit 167. The controller 110 detects knocking input 622 on the common screen 621 through the touch screen 190 and the touch screen controller 195. Knocking sound generated by the knocking input 622 and knocking pressure detected on the touch screen 195 may be different from those of a general tap (no shown) such that the knocking input 622 and the general tap are sufficiently distinguished from each other. It will be appreciated by a person having an ordinary skill in the art that the controller 110 may distinguish the knocking input 622 from the tap using various methods. The controller 110 may receive at least one position information corresponding to the knocking input 622 from the touch screen controller 195 (e.g., a plurality of X and Y coordinates corresponding to a position 622a of the knocking input 622)

The controller 110 may store the received position information about knocking on the touch screen 190, knocking input detection time (e.g., at 2:30 P.M.), and knocking information corresponding to knocking (e.g., knocking duration time, knocking pressure, etc.) in the storage 175.

The controller 110 of the teacher portable apparatus 500 may generate a control signal corresponding to the stored knocking, knocking input detection time, or knocking information. The control signal may include screen change requesting information for changing the screen of the student portable apparatus 700 into the common screen 621 of the interactive white board 600. The screen change requesting information may be configured with a message or a packet, and may include at least one bit. The communication unit may transmit a control signal generated by control of the controller 110 to the student portable apparatus 700.

Referring to FIG. 13(c), the student portable apparatus 700 displays a personal screen 711. The controller 110 may receive the control signal from the interactive white board 600 through the communication unit thereof. The controller 110 may recognize the screen change requesting information extracted from the received control signal. The controller may request the common screen 621 of the interactive white board 600 in response to the screen change requesting information. The controller 110 first displays the common screen 621 previously stored in the storage in response to the screen change requesting information, and requests updating the common screen 621 of the interactive white board 600.

Referring to FIG. 13(d), the student portable apparatus 700 includes the common screen 621. The controller 110 of the interactive white board 600 may transmit the common screen data (not shown) corresponding to the common screen 621 to the student portable apparatus 700 by request of the student portable apparatus 700. The controller 110 of the student portable apparatus 700 may display the received common screen data on the touch screen 190 thereof.

The screen displaying methods according to exemplary embodiments may be achieved in the form of a program command to be performed by various computers and recorded in a computer readable medium. The computer readable medium may include a program command, a data file, a data structure, etc. or combination thereof. The program command recorded in the medium may be desired and configured specially for the exemplary embodiments, or may be publicly known and usable to those skilled in computer software.

The computer readable medium is a medium which does not store data temporarily such as a register, cash, and memory but stores data semi-permanently and is readable by devices. More specifically, the aforementioned program command may be stored and provided in a non-transitory readable medium such as a compact disk (CD), digital video disk (DVD), hard disk, Blu-ray disk, universal serial bus (USB), memory card, and read-only memory (ROM).

As described above, according to exemplary embodiments, there are provided a portable apparatus and a screen displaying method of the portable apparatus, in which a personal screen of the portable apparatus may be controllable in response to a touch and successive touch motions thereon.

Further, there are provided a portable apparatus and a screen displaying method of the portable apparatus, in which a personal screen of the portable apparatus is changeable into at least one of a common screen and a management screen in response to a touch and successive touch motions thereon.

Also, there are provided a portable apparatus and a screen displaying method of the portable apparatus, in which a common screen of the portable apparatus is changeable into at least one of a management screen and a personal screen in response to a touch and successive touch motions thereon.

Further, there are provided a portable apparatus and a screen displaying method of the portable apparatus, in which a content of a personal screen of the portable apparatus is displayable on a common screen in response to a touch and successive touch motions, for example, drag and drop, thereon.

Also, there are provided a portable apparatus and a screen displaying method of the portable apparatus, in which a personal screen displayed on the portable apparatus in response to a touch and successive touch motions received from another portable apparatus is changeable into the common screen of the interactive white board.

Further, there are provided a portable apparatus and a screen displaying method of the portable apparatus, in which a message written on the personal screen of the portable apparatus is transmittable to another portable apparatus in response to touch.

Although a few exemplary embodiments have been shown and described, it will be appreciated by those skilled in the art that changes may be made in these exemplary embodiments without departing from the principles and spirit of the disclosure, the scope of which is defined in the appended claims and their equivalents.

What is claimed is:

1. A screen displaying method in a portable apparatus, comprising:
    displaying a personal screen of an application executed by the portable apparatus in response to input user identification information;
    detecting a touch on the personal screen; and
    controlling the personal screen in response to the touch, wherein the controlling comprises:
        in response to the touch on the personal screen, controlling to display a second screen that includes at least a portion of a common screen, the common screen displaying content transmitted from a first external device among a plurality of external devices, connectable to the portable apparatus through a network; and
        in response to a touch on the second screen, controlling to display a third screen that includes at least a portion of a management screen, the management screen displaying at least one reduced screen of a personal screen displayed on a second external device among the plurality of external devices.

2. The screen displaying method according to claim 1, further comprising
    verifying the input user identification information based on user identification information stored in the portable apparatus.

3. The screen displaying method according to claim 1, wherein the application is an education application and the personal screen comprises at least one of a teacher personal screen and a student personal screen in response to the input user identification information, and the common screen comprises a screen of an interactive white board connected with the portable apparatus through a wired or wireless network.

4. The screen displaying method according to claim 1, wherein the touch comprises at least one from among a flick, a drag, and a drag and drop.

5. The screen displaying method according to claim 1, wherein the controlling to display the second screen comprises changing the personal screen into the common screen according to a direction of the touch on the personal screen.

6. The screen displaying method according to claim 1, wherein the controlling to display the second screen comprises displaying a part of the common screen at one side of the personal screen in response to a direction of the touch on the personal screen.

7. The screen displaying method according to claim 1, wherein the controlling to display the third screen comprises changing the second screen into the management screen in response to a direction of the touch on the second screen.

8. The screen displaying method according to claim 1, wherein the controlling to display the second screen comprises changing the personal screen into the common screen in response to a direction of the touch on the personal screen, and
    wherein the controlling to display the third screen comprises changing the second screen into the management screen in response to a direction of the touch on the second screen.

9. A screen displaying method in a portable apparatus among a plurality of portable apparatuses, comprising:
    displaying a personal screen of an application executed by the portable apparatus in response to input user identification information;
    detecting a touch on the personal screen; and
    controlling the personal screen in response to the touch, wherein the controlling comprises:
        in response to the touch on the personal screen, changing the personal screen into a common screen, the common screen displaying content transmitted from an external device, connectable to the portable apparatus through a network, and
        in response to a touch on the common screen, changing the common screen into a management screen, the management screen displaying at least one of reduced personal screens displayed on the plurality of portable apparatuses, and
    wherein the at least one of reduced personal screens displayed on the management screen is enlarged in response to a tap detected on a corresponding reduced personal screen.

10. The screen displaying method according to claim 3, wherein at least one reduced student personal screen of the management screen displays a message receiving icon informing that a message is received from a student portable apparatus corresponding to the at least one reduced student personal screen.

11. The screen displaying method according to claim 3, wherein the student personal screen is displayed in response to the input user identification information, and a message written on the student personal screen is transmittable to another portable apparatus.

12. A screen displaying method in a portable apparatus among a plurality of portable apparatuses, comprising:
    displaying a personal screen of an application executed by the portable apparatus in response to input user identification information;
    detecting a touch on the personal screen; and
    controlling the personal screen in response to the touch, wherein the controlling comprises:
        in response to the touch on the personal screen, controlling to display a second screen that includes at least a portion of a common screen, the common screen displaying content transmitted from an external device, connectable to the portable apparatus through a network; and
        in response to a touch on the second screen, controlling to display a third screen that includes at least a portion of a management screen, the management screen displaying at least one of reduced personal screens displayed on the plurality of portable apparatuses, and
    wherein the management screen is changed into the personal screen in response to a touch on the management screen.

13. The screen displaying method according to claim 1, wherein the controlling further comprises:
   changing the personal screen into the common screen when the touch on the personal screen is a drag and drop; and
   displaying contents selected by the drag and drop on the common screen.

14. The screen displaying method according to claim 13, wherein the contents comprises a text file, an image file, an audio file, a video file, or a reduced student personal screen.

15. The screen displaying method according to claim 1, further comprising providing at least one of a visual feedback, an aural feedback and a tactile feedback in response to the touch on the personal screen.

16. A non-transitory computer readable recording medium having embodied thereon at least one program comprising a command for performing the screen displaying method of claim 1.

* * * * *